(12) United States Patent
Lewis et al.

(10) Patent No.: US 9,776,076 B2
(45) Date of Patent: Oct. 3, 2017

(54) SYSTEMS AND METHODS FOR GENERATING A COMPILATION REEL IN GAME VIDEO

(71) Applicant: Electronic Arts, Inc., Redwood City, CA (US)

(72) Inventors: Michael Lewis, San Francisco, CA (US); Hans Van Veenendaal, Vancouver (CA); Jonathan Back, West Vancouver (CA); Thomas Bruckschlegel, Adliswil (CH)

(73) Assignee: ELECTRONIC ARTS INC., Redwood City, CA (US)

( * ) Notice: Subject to any disclaimer, the term of this patent is extended or adjusted under 35 U.S.C. 154(b) by 537 days.

(21) Appl. No.: 14/216,854

(22) Filed: Mar. 17, 2014

(65) Prior Publication Data

US 2014/0274297 A1 Sep. 18, 2014

Related U.S. Application Data

(60) Provisional application No. 61/800,159, filed on Mar. 15, 2013.

(51) Int. Cl.
*A63F 13/00* (2014.01)
*H04N 21/84* (2011.01)
(Continued)

(52) U.S. Cl.
CPC ............ *A63F 13/00* (2013.01); *A63F 13/335* (2014.09); *A63F 13/69* (2014.09); *A63F 13/86* (2014.09);
(Continued)

(58) Field of Classification Search
CPC .................................................. G07F 17/3244
See application file for complete search history.

(56) References Cited

U.S. PATENT DOCUMENTS

2013/0084940 A1* 4/2013 Lee ..................... G07F 17/3267
463/20
2014/0274387 A1 9/2014 Lewis et al.

OTHER PUBLICATIONS

Johnson, Eric, "Playing to the Crowd: Gamecasting Goes Mainstream," Apr. 9, 2013 [retrieved online at http://allthingsd.com/?p=310154&ak_action=printable on Jul. 25, 2014].

* cited by examiner

*Primary Examiner* — Dmitry Suhol
*Assistant Examiner* — Ankit Doshi
(74) *Attorney, Agent, or Firm* — McDermott Will & Emery LLP

(57) ABSTRACT

In some embodiments, a system comprises an interface, a set of compilation rules, a trigger indication selection module, and a compilation reel generation module. The interface may be configured to receive metadata corresponding to gameplay on a digital device. The metadata may include a set of trigger indicators associated with a set of gameplay events occurring during the gameplay. The set of trigger indicators may be based on a set of trigger conditions occurring during the gameplay. The trigger indicator selection module may be configured to select a subset of the set of trigger indicators based on the set of compilation reel rules. The compilation reel generation module may be configured to generate a compilation reel based on the subset of trigger indicators selected by the trigger indicator selection module, the compilation reel including video of the gameplay events corresponding to the subset of trigger indicators.

23 Claims, 12 Drawing Sheets

(51) Int. Cl.
*A63F 13/86* (2014.01)
*A63F 13/69* (2014.01)
*A63F 13/335* (2014.01)
*H04N 21/433* (2011.01)
*H04N 21/845* (2011.01)
*H04N 21/8549* (2011.01)

(52) U.S. Cl.
CPC ......... *H04N 21/4334* (2013.01); *H04N 21/84* (2013.01); *H04N 21/8456* (2013.01); *H04N 21/8549* (2013.01)

SYSTEMS AND METHODS FOR GENERATING A COMPILATION REEL IN GAME VIDEO

CROSS-REFERENCE TO RELATED APPLICATIONS

The present application claims benefit of and priority to U.S. Provisional Patent Application No. 61/800,159 filed Mar. 15, 2013, entitled "Capturing Game Video and Creating Highlight Reels from the Captured Content," which is incorporated by reference herein.

BACKGROUND

1. Field of the Invention

The present invention generally relates to recording gameplay. More particularly, the invention relates to systems and methods for generating a compilation reel in game video.

2. Description of Related Art

Computer networks have revolutionized recording and sharing of gameplay. For example, player devices in the home (e.g., Xbox, Playstation, or Wii) may record and provide video for players and other viewers. Since player devices both execute and generate video of gameplay, it is possible to capture unique perspectives, record competitions, and/or significant events.

In many situations, however, the length of recordings (i.e., footage) generated by gameplay may be very long. Players who record a game video often find it difficult to edit long recordings to find or highlight interesting or significant events. For instance, a recording of a golf game may include depictions of many shots and greens as the game progresses. The depictions may appear boring and repetitive. Many portions of the video of the gameplay may not include the drama or action that characterizes more interesting moments. Similarly, a video recording of an RPG such as Dragon Age may include many minor fights and logistics that may appear repetitive to some viewers. Manually searching through long gameplay video for interesting events may require an editor to scan all of the footage to find the few interesting events that are worthy of flagging, showing to others, and/or storing. A person faced with searching and editing gameplay video of an activity may find the task tedious or may choose not to undertake the task at all.

SUMMARY OF EMBODIMENTS

In some embodiments, a system comprises an interface, a set of compilation rules, a trigger indication selection module, and a compilation reel generation module. The interface may be configured to receive metadata corresponding to gameplay on a digital device. The metadata may include a set of trigger indicators associated with a set of gameplay events occurring during the gameplay. The set of trigger indicators may be based on a set of trigger conditions occurring during the gameplay. The trigger indicator selection module may be configured to select a subset of the set of trigger indicators based on the set of compilation reel rules. The compilation reel generation module may be configured to generate a compilation reel based on the subset of trigger indicators selected by the trigger indicator selection module, the compilation reel including video of the gameplay events corresponding to the subset of trigger indicators.

In some embodiments, the at least one of the set of trigger conditions may be satisfied by at least one of the set of gameplay events. The compilation reel may comprise two or more segments from at least one video recording of the gameplay. The compilation reel may comprise two or more links to at least one video recording of the gameplay.

In some embodiments, at least one of the compilation reel rules require selection of the subset of the set of trigger indicators be based, at least in part, on the metadata. The system may further comprise a segment duration module configured to identify a start time and determine an end time of at least one segment of a video recording of the gameplay. The at least one segment may correspond to at least one of the subset of trigger indicators. The video of the gameplay events may correspond to the subset of trigger indicators comprises the video of gameplay events including the at least one segment of the video recording of the gameplay.

In various embodiments, the system may further comprise a trigger profile module configured to provide at least one trigger to the digital device, the trigger being satisfied by at least one of the set of trigger conditions occurring during the gameplay. The metadata may include at least one category of at least one of the set of trigger indicators. In some embodiments, the trigger indicator selection module may be configured to select the subset of the set of trigger indicators based on the set of compilation reel rules comprises the trigger indicator selection module configured to select the subset of the set of trigger indicators based, at least in part, on the at least one category.

An exemplary system may comprise receiving metadata corresponding to gameplay on a digital device, the metadata including a set of trigger indicators associated with a set of gameplay events occurring during the gameplay, the set of trigger indicators being based on a set of trigger conditions occurring during the gameplay, retrieving a set of compilation reel rules, selecting a subset of the set of trigger indicators based on the set of compilation reel rules, and generating a compilation reel based on the subset of trigger indicators selected by the trigger indicator selection module, the compilation reel including video of the gameplay events corresponding to the subset of trigger indicators.

In various embodiments, at least one of the set of trigger conditions is satisfied by at least one of the set of gameplay events. The compilation reel may comprise two or more segments from at least one video recording of the gameplay. The compilation reel may comprise two or more links to at least one video recording of the gameplay.

In some embodiments, at least one of the compilation reel rules require selection of the subset of the set of trigger indicators be based, at least in part, on the metadata. The method may further comprise identifying a start time and determining an end time of at least one segment of a video recording of the gameplay.

In some embodiments, the at least one segment corresponds to at least one of the subset of trigger indicators. The video of the gameplay events corresponding to the subset of trigger indicators may comprise the video of gameplay events including the at least one segment of the video recording of the gameplay. The method may further comprise providing at least one trigger to the digital device, the trigger being satisfied by at least one of the set of trigger conditions occurring during the gameplay.

In various embodiments, the metadata includes at least one category of at least one of the set of trigger indicators. Selecting the subset of the set of trigger indicators based on the set of compilation reel rules may comprise selecting the subset of the set of trigger indicators based, at least in part, on the at least one category.

An exemplary non-transitory computer readable media may comprise executable instructions. The instructions may be executable by a processor to perform a method. The method may comprise receiving metadata corresponding to gameplay on a digital device, the metadata including a set of trigger indicators associated with a set of gameplay events occurring during the gameplay, the set of trigger indicators being based on a set of trigger conditions occurring during the gameplay, retrieving a set of compilation reel rules, selecting a subset of the set of trigger indicators based on the set of compilation reel rules, and generating a compilation reel based on the subset of trigger indicators selected by the trigger indicator selection module, the compilation reel including video of the gameplay events corresponding to the subset of trigger indicators.

DETAILED DESCRIPTION OF EMBODIMENTS

Figure 1:
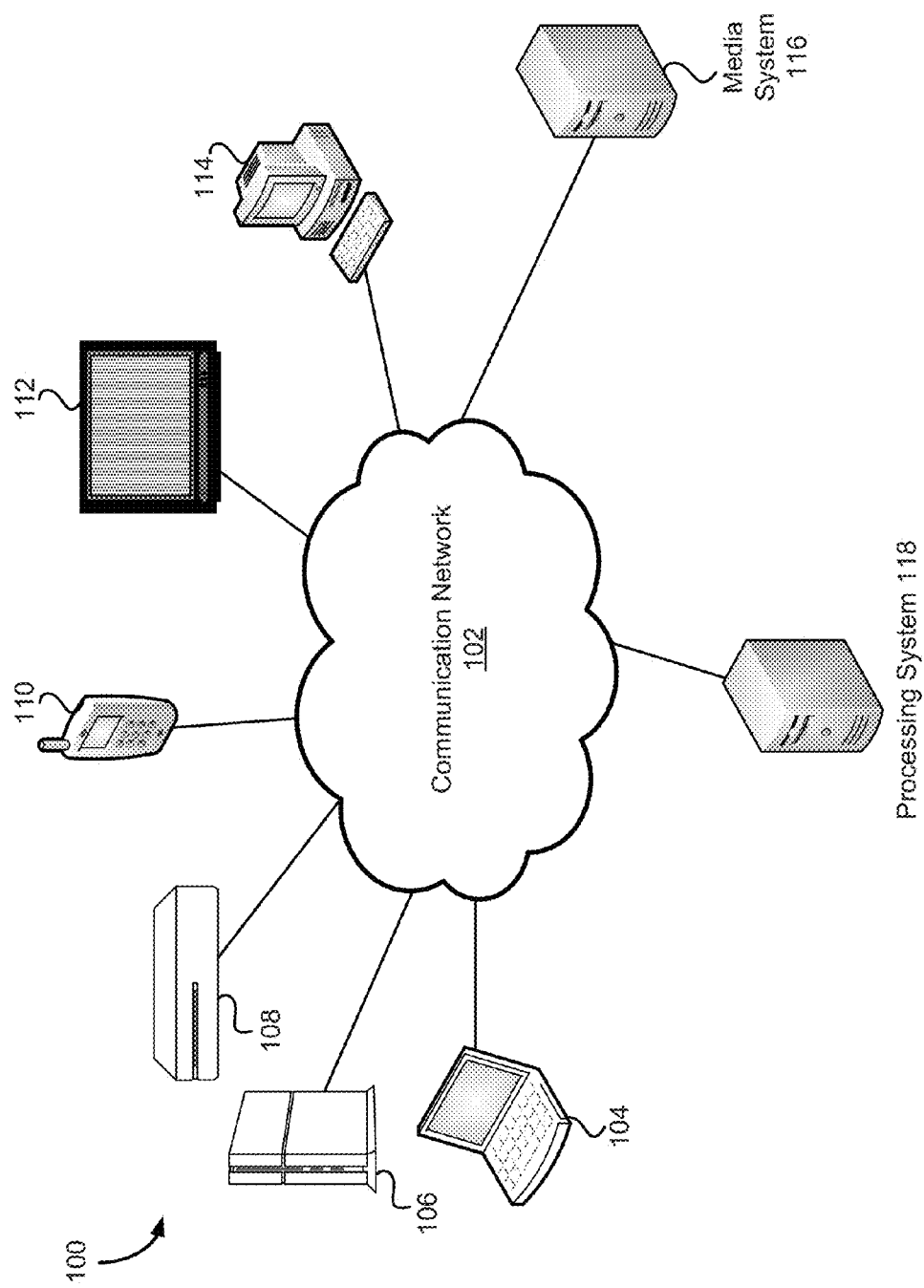
FIG. 1 is a block diagram of different player and viewer devices in some embodiments.

In various embodiments, video of gameplay of a game (e.g., a game being played on a console such as an Xbox, on a smartphone, or on a personal computer) may be shared with others (e.g., by Video on Demand (VOD)). For example, during gameplay, video of the gameplay may be both rendered and automatically recorded. The video may be stored and shared by a media system such as YouTube. In some embodiments, a system may enable appending metadata to videos to enable media systems or any digital device to create a video timeline identifying events of interest in the gameplay video.

A player may play a game on a digital device (e.g., a player device) and provide the video of gameplay to be broadcast or otherwise provided to either the public or select individuals (or groups of individuals). Since gameplay video may be very long unless edited, techniques are described herein to allow identification of times, positions, or portions of events of interest in the video. For example, the identified times, positions, or portions in the video may appear as annotations or indications in a timeline associated with a video of gameplay. A viewer may then utilize the annotations or indications to jump to the events in the video.

Identifying times, positions, or portions in gameplay video may be performed in many different ways. In some embodiments, a game may be associated with a set of triggers. Each trigger defines one or more trigger conditions. A trigger may be satisfied based on occurrences in gameplay that meet the trigger conditions defined by the trigger. Once a trigger is satisfied, a timestamp or any other metric may be determined to identify times, positions, or portions in gameplay video to indicate an event of interest. A trigger may be satisfied in any number of ways, including, for example, the accomplishment of an achievement, completing a goal, earning an award, or the like. A trigger may also be satisfied by, in some embodiments, a player manually indicating that they wish to mark a timeline of the video or otherwise distinguish the event.

In various embodiments, the player device may provide metadata associated with satisfied triggers to a processing system. All or some of the metadata may be associated with satisfaction of the triggers. For example, all or some of the metadata may include trigger satisfaction indicators (e.g., the timestamp or other metric). The trigger satisfaction indicators may be associated with times, positions, or portions of gameplay video.

In some embodiments, the processing system may not receive the video, rather the processing system may assist in generating annotations or the like which may be utilized to mark or otherwise place indications of events of interest in a timeline associated with the gameplay video. For example, the gameplay video may be provided to a media system. The processing system may receive the metadata, generate annotations, and provide the annotations to the media system to mark the timeline of the gameplay video to indicate the events.

In various embodiments, a compilation of portions or segments of one or more videos of gameplay may be generated. For example, a player may wish a video including events of interest without including other footage. As a result, a shorter video featuring events of interest may be generated based on one or more longer videos of gameplay.

In various embodiments, the processing system may identify trigger satisfaction indicators associated with content to include in the compilation reel. There may be many ways to identify trigger satisfaction indicators. In some embodiments, the processing system or the player device may associate one or more trigger satisfaction indicators with a rank and/or a weight. The rank and/or weight may be associated with the satisfaction of the trigger conditions. A rank may indicate a desirability of including a portion of video associated with one or more trigger satisfaction indicators in the compilation reel. A weight may indicate a significance of the event(s) that satisfied the trigger conditions.

In various embodiments, the processing system or player device determines a rank and/or weight based on compilation rules associated with the games. For example, the processing system or player device may associate a rank and/or weight for each trigger satisfaction indicator (e.g., associating the rank and/or weight with trigger satisfaction indicators) based on the compilation rules. In some embodiments, if the player device determines or associates the rank and/or weight each time a trigger is satisfied, the player device may provide the rank and/or weight as well as any associations to the processing system as metadata.

The processing system may select one or more segments or positions in a video based on the rank and/or weight associated with the trigger satisfaction indicators (e.g., based on the compilation rules). The selected segments or positions may be included into at least one compilation reels. Order of segments or positions in the compilation reel may also be determined based on rank and/or weight. Those skilled in the art will appreciate that rank and/or weight may not be utilized. In some embodiments, a player or other entity may select segments or positions from previously recorded video to include in the compilation reel based on indications in the video timeline which are generated as discussed herein.

In various embodiments, the processing system may determine a duration of segments or duration based on positions in the video of gameplay. In some embodiments, the processing system only determines duration(s) of selected segments or segments based on selected trigger satisfaction indicators to be included in the compilation reel.

In various embodiments, the processing system may retrieve a profile to determine durations of segments. The processing system may utilize the profile to assist in confirming, creating, or adjusting the beginning of a segment of the video. Similarly, the processing system may utilize the profile to assist in confirming, creating, or adjusting the ending of the segment of the video.

The processing system and/or media system may generate the compilation reel based on the selected segments from one or more videos. The compilation reel may be available to the player of the player device playing the game, the public, or any number of other individuals (e.g., those that the player chooses to share with).

The compilation reel may comprise segments of any duration from one or more videos of gameplay. The gameplay may be the same or different games. In some embodiments, the compilation reel may include gameplay by different players (e.g., playing a multiplayer game, playing a different instance of the same game, playing one or more different versions of the same game, or playing different games).

FIG. 1 is an environment 100 of different player and viewer devices 104-114 in some embodiments. The environment 100 may include a laptop 104, game console (e.g., Sony Playstation) 106, game console (Microsoft Xbox) 108, smartphone 110, smart television 112, and/or personal computer 114 in communication over a communication network 102 with the media system 116 and/or the processing system 118. Any of devices 104-114 may be player devices (i.e., a digital device that is used to play a game), viewer devices (i.e., a digital device that is used to view video of at least part of a game) or both. A digital device is any device with a processor and memory. Digital devices are further described regarding FIG. 8.

Player and viewer devices 104-114 represent a variety of different digital devices that may engage in gameplay (e.g., as player devices) and/or may view video (e.g., as viewer devices). For example, player device 104 may be a laptop, notebook, media device, tablet, or any other mobile device capable of playing a game or viewing video. Player devices 106 and 108 may be a Sony Playstation and a Microsoft Xbox, respectively, or may include any other game console (e.g., such as a Nintendo Wii). Player device 110 maybe a smartphone, smart watch, GoogleGlass, a personal communication device, or wearable technology capable of playing a game, assisting in playing a game, viewing video, or assisting in viewing video. Player device 112 may be a smart television or any other smart appliance capable of playing a game, assisting in playing a game, viewing video, or assisting in viewing video. Player device 114 may be a personal computer or any other computing device.

In various embodiments, any of the player and viewer devices 104-114 may play a game and generate video. The video may be provided to the media system 116. The media system 116 may comprise any number of digital devices configured to provide access or broadcast gameplay video. In one example, video of gameplay may be provided to the media system 116 during gameplay. In another example, the video may be provided to the media system 116 after gameplay, after a delay, and/or as network connectivity allows (e.g., depending upon a quality of services (QoS)). Video of gameplay (i.e., gameplay video) may be automatically streamed and/or updated to any number of media systems 116 (e.g., the gameplay video may be broadcast or available to other users through the media system 116 without requiring the player's interaction or input). The media system 116 may include, but not be limited to, Twitch TV and YouTube. In various embodiments, any or all of the player and viewer devices 104-114 may initiate providing video without player intervention.

In various embodiments, when a game is selected for play, a player device (e.g., player device 108) retrieves a trigger profile (e.g., from the processing system 118). The trigger profile may comprise any number of triggers, each trigger defining one or more trigger conditions. Any number of the triggers may be associated with the game. In some embodiments, the trigger profile is retrieved from a plurality of trigger profiles based on the selected game.

A trigger associated with the game Tiger Woods PGA Tour may define trigger condition that is satisfied when the player shoots a hole-in-one or eagles in golf. A trigger associated with the game Battlefield 3 may define a trigger condition that is satisfied when a player makes a 1,000 meter headshot with a sniper rifle. Those skilled in the art will appreciate that any number of triggers may define trigger conditions based on a particular game, a game type (e.g., sport, first person shooter), and/or game version (e.g., Tiger Woods PGA Tour 13 and Tiger Woods PGA Tour 14), for example.

When a trigger is satisfied by an occurrence during gameplay which satisfies one or more trigger conditions, the player device may generate a trigger satisfaction indicator. The trigger satisfaction indicator may be related to the gameplay video and indicate at what time, position, or portion of the gameplay video that an event that satisfied the trigger conditions occurred. The player device may provide metadata including the trigger satisfaction indicator to the processing system 118 (e.g., via the communication network 102). The metadata may further include a video identifier to identify the video provided to the media system 116, a game identifier, player identifier or the like (further described herein).

The processing system 118 is any number of digital devices configured to assist in indicating events in a gameplay video. In various embodiments, the processing system 118 receives metadata from the player device and generates annotations based on the metadata. The annotations may include game event markers or may include instructions for a media system 116 to generate the game event markers on a timeline associated with the gameplay video to allow viewers to jump to points of potential interest in the gameplay video. Other annotations may include labels for points of potential interest (e.g., "Hole in One!"), titles of video, the indicators of potential interest in a timeline associated with the video, information contained in bubbles to appear over the video, information regarding whether the video is to be shared and/or the other viewers that the video is to be shared with, or the like. In some embodiments, the processing system 118 may provide annotations to the media system 116 utilizing an API. In some embodiments, the processing system 118 provides the gameplay video.

The communication network 102 may include a computer network or combination of user networks (e.g., a combination of wireless and wired networks). The communication network 102 may include technologies such as Ethernet, 802.11x, worldwide interoperability for microwave access WiMAX, 2G, 3G, 4G, CDMA, GSM, LTE, digital subscriber line (DSL), and/or the like. The communication network 102 may further include networking protocols such as multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and/or the like. The data exchanged over the communication network 102 can be represented using technologies and/or formats including hypertext markup language (HTML) and extensible markup language (XML).

Although player and viewer devices 104-114 are depicted in environment 100, there may be any number of digital devices. Further, there may be more or fewer different types of digital devices (e.g., the digital devices may comprise one or more game consoles, smartphones, smart televisions and/or the like). In some embodiments, any number of the player and viewer devices 104-114 may be generating video of gameplay of one or more games and any number of the player and viewer devices 104-114 may be view video of the gameplay.

Figure 2:
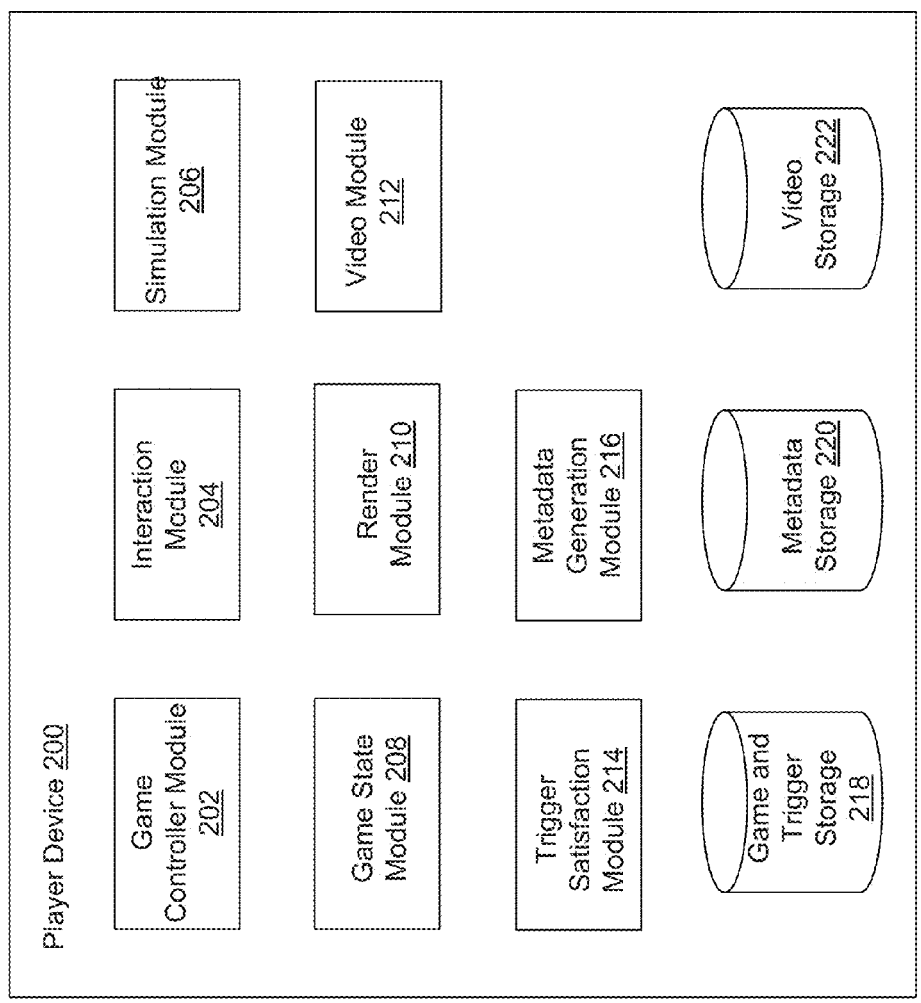
FIG. 2 is a block diagram of a player device in some embodiments.

FIG. 2 is a block diagram of a player device 200 in some embodiments. The player device may, for example, be or include any of player or viewer devices 104-114. The player device 200 comprises a game controller module 202, an interaction module 204, a simulation module 206, a game state module 208, a render module 210, a video module 212, a trigger satisfaction module 214, a metadata generation module 216, a game and trigger storage 218, a metadata storage 220, and a video storage 222.

The game controller module 202 may initiate and or control gameplay of a game. In some embodiments, the game controller module 202 receives a selection of a game from a player. The game controller module 202 may execute the selected game and/or control gameplay. In various embodiments, the game controller module 202 may receive user control signals to control or influence gameplay.

The interaction module 204 may provide an interface to the player to allow the player to control gameplay, provide personal settings, receive user control signals, or the like. In various embodiments, the interaction module 204 provides the game controller module 202 with the player control signals received from, for example, an input device (e.g., a controller, keyboard, mouse, motion detector, camera, touch screen and/or sensor).

The simulation module 206 may simulate gameplay based on game rules and inputs (e.g., user control signals) by any number of players. In various embodiments, the simulation module 206 is utilized in turn by turn games and may not be utilized in other games.

The simulation module 206, for example, may determine the outcome of any number of variables including game logic (e.g., based on game rules from the game and trigger storage 218) as well as choices by any number of players. In various embodiments, the simulation may be performed by another digital device. For example, the player device 200 may provide the selection(s) and/or the current game state to the processing system 118 via the communication network 102. The processing system 118 may perform the simulation based game rules, the player selection(s), and the current game state. In various embodiments, the processing system 118 and/or any digital device may provide the selection(s) and/or current game state to any digital device which may perform the simulation.

The game state module 208 may maintain, update, and/or retrieve a game state associated with the activated game. In some embodiments, the game state module 208 may retrieve a game state from a game and trigger storage 218. In some embodiments, the game state module 208 provides the game state to the simulation module 206 and/or the game controller module 202 and the interaction module 204 may then provide user interfaces to a player requesting input and/or selection(s) associated with the game.

The game state module 208 may maintain a current state of gameplay. Based on simulation results from the simulation module 206 and/or selection(s) received from the user, the game state module 208 may update the current game state to a new game state. The updated game state may subsequently be provided, in some embodiments, to one or more other processing systems 118 or other digital devices. In various embodiments, game states are not provided between devices but rather the game state is individually updated on each device.

During or after simulation, a simulation result may be rendered. In various embodiments, the render module 210 renders video to depict the simulation result(s) or any executed gameplay. The gameplay video and/or images from the rendering may be displayed on the player device 200 and/or other digital devices (e.g., the rendering may be displayed on other digital devices in a multiplayer game or the rendering may be provided to a media system to allow others to view gameplay as described herein).

In some embodiments, the video module 212 may provide to or display video from the render module 210 on the player device 200. The video module 212 may stream and/or upload video and/or images based on the rendering of the render module 210. For example, the video module 212 may broadcast, upload, or otherwise provide the video and/or images to the media system 116 and/or one or more of the player devices. In another example, the video module 212, render module 210, the processing system 118, and/or the media system 116 may perform multiple renderings from different viewpoints and provide video and/or audio to different user devices. Rendered video may include video and/or audio.

In various embodiments, the video module 212 may store the video in video storage 222 for later playback by the player of the player device 200. In some embodiments, the video module 212 stores all or some of the video in the video storage 222 until all or some of the video may be provided to another digital device (e.g., media system 116).

In some embodiments, the video module 212 automatically provides the gameplay video to the media system 116. In one example, the player may opt-out of automatically providing the gameplay video to the media system 116 and/or opt out of broadcasting the gameplay video. In various embodiments, the video module 212 may require the player to agree or opt-in to broadcast or provide the gameplay video.

The trigger satisfaction module 214 may retrieve one or more triggers associated with a game and may determine if trigger conditions associated with at least one trigger are satisfied based on occurrences during gameplay.

When a game is selected, the trigger satisfaction module 214 may retrieve a trigger profile from the game and trigger storage 218 based on the selected game. The trigger profile may comprise any number of triggers, each trigger defining one or more trigger conditions. Any number of the triggers may be associated with the selected game.

In various embodiments, the trigger satisfaction module 214 may monitor gameplay to detect occurrences that satisfy trigger conditions (e.g., the trigger satisfaction module 214 may determine when trigger conditions are satisfied such that the trigger satisfaction module 214 may detect when a trigger is satisfied). When a trigger is satisfied by an occurrence during gameplay (e.g., the occurrence satisfying one or more trigger conditions), the trigger satisfaction module 214 may generate a trigger satisfaction indicator. The trigger satisfaction indicator may be related to the gameplay video and indicate at what time, position, or portion (e.g., segment) in the gameplay video generated by the video module 212 that an event that satisfied the trigger conditions occurred. The trigger satisfaction indicator may indicate a time, position, or segment in the gameplay video of an event that satisfied at least one trigger.

In various embodiments, the trigger satisfaction module 214 may identify the trigger that was satisfied and/or the type of trigger that was satisfied and provide identifiers to the metadata generation module 216. In some embodiments, the trigger satisfaction module 214 may retrieve the trigger identifier, type of trigger, description or other identifying information describing the trigger that was satisfied from the metadata storage 220 and/or the game and trigger storage 218. For example, the trigger satisfaction module 214 may provide an identifier that a trigger was satisfied as well as a description of the trigger "e.g., Quadrakill." The trigger satisfaction module 214 may also add information regarding gameplay such as the player name, type of game, or any other information. For example, the trigger satisfaction module 214 may provide a description of the satisfied trigger as "Mikulthegreat Quadrakill" for inclusion in metadata to be provided to the processing system 118.

The metadata generation module 216 may generate metadata including or based on the trigger satisfaction indicators from the trigger satisfaction module 214 as well as any other information. In various embodiments, the metadata generated by the metadata generation module 216 includes a game identifier that identifies the game, a gameplay video identifier that may associate the metadata with a specific video, identification information regarding the media system 116 that received the video, or the like. In some embodiments, the metadata includes an identifier that a trigger was satisfied and/or a description of the trigger with any other information. The metadata may further include a video identifier to identify the video provided to the media system 116, a game identifier, player identifier or the like (further described herein).

The metadata generation module 216 may provide the metadata to the processing system 118 (e.g., via the communication server 102). In various embodiments, the metadata generation module 216 stores all or some of the metadata in the metadata storage 220.

In one example, metadata generation module 216 may provide metadata to the processing system 118 during gameplay. In another example, the metadata may be provided to the processing system 118 after gameplay, after a delay, and/or as network connectivity allows (e.g., depending upon a quality of services (QoS)). Metadata associated with gameplay may be automatically streamed and/or updated to any number of processing systems 118. In various embodiments, any or all of the player and viewer devices 104-114 may initiate providing metadata without player intervention.

The game and trigger storage 218, the metadata storage 220, and the video storage 222 may comprise any number and any type of storage devices and/or data structures.

It will be appreciated that a "module" as referred to herein may comprise software, hardware, firmware, and/or circuitry. In one example, one or more software programs comprising instructions capable of being executable by a processor may perform one or more of the functions of the modules described herein. In another example, circuitry may perform the same or similar functions. Alternative embodiments may comprise more, less, or functionally equivalent modules and still be within the scope of present embodiments.

Figure 3:
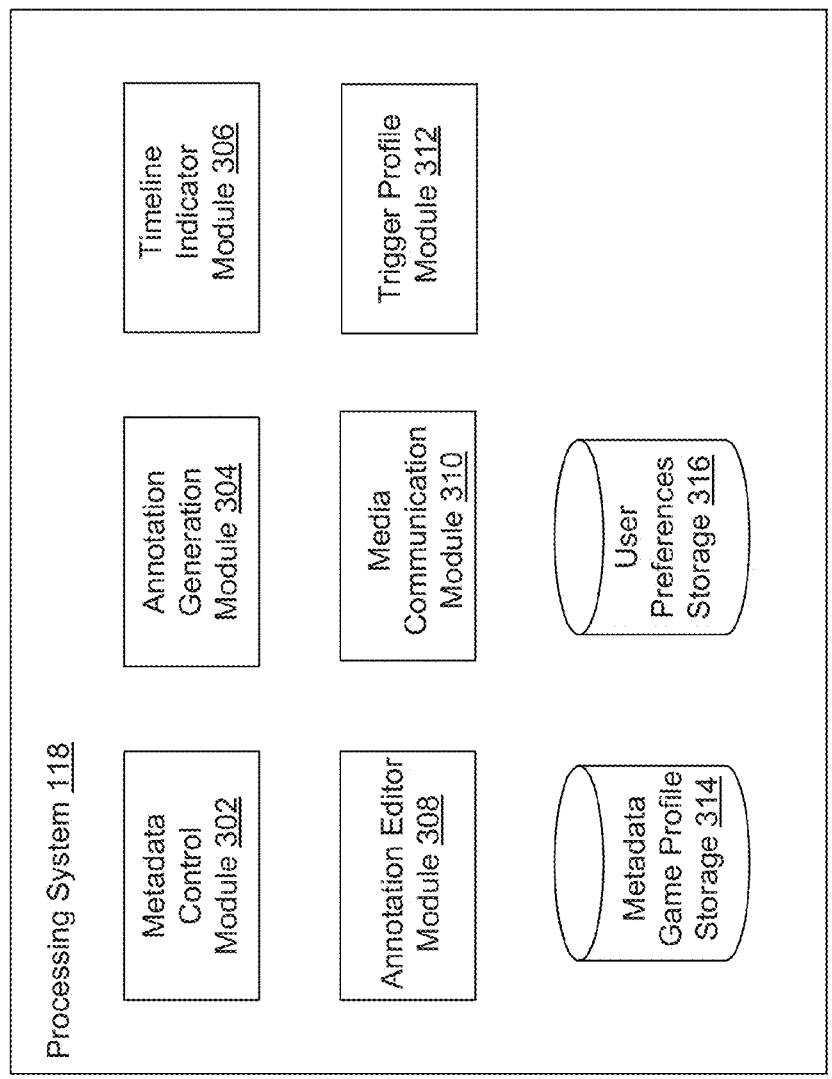
FIG. 3 is a block diagram of a processing system in some embodiments.

FIG. 3 is a block diagram of a processing system 118 in some embodiments. The processing system comprises a metadata control module 302, an annotation generation module 304, a timeline indicator module 306, an annotation editor module 308, a media communication module 310, a trigger profile module 312, a metadata game profile storage 314, and a user preferences storage 316.

The metadata control module 302 may receive metadata from the player device 200 (e.g., from the metadata generation module 216). The metadata may comprise any kind of information. For example, the metadata may comprise, but is not limited to, a player device identifier, a player identifier, a game identifier, a game instance identifier, a video identifier, and/or a media system identifier. The player device identifier may comprise an IP address, MAC address, or any other information that may be utilized to identify the player device 200 that provided the metadata. The player identifier may comprise a username, name, or any other information that may be used or associated with the player of the player device 200. The game identifier may identify the game (e.g., the name of the game, type of the game, or the like). The game instance identifier may comprise a session identifier or any other information that identifiers the instance of the game executing on the player device 200. For example, based on the metadata may identify the player device (e.g., based on a MAC address), a player associated with the player device (e.g., based on a player device identifier), a game (e.g., based on an identifier of a game such as FIFA Football), and/or a game instance (e.g., based on a session or instance identifier).

In various embodiments, the metadata may comprise a video identifier comprising information identifying with video of the gameplay which may be shared with the media system 116. The video identifier may be associated with, for example, annotations to allow a media system 116 to identify the correct video in order to add indicators in the related timeline. The media system identifier may comprise information regarding the media system 116 including a name or other identifying information of a provider associated with the media system 116, the IP address of the media system 116, or any information regarding the software executing on the media system 116 (e.g., to assist in identifying and/or utilizing APIs of the media system 116).

In some embodiments, the metadata control module 302 may identify or retrieve trigger satisfaction triggers or any other information from the metadata. In one example, the metadata control module 302 identifiers and retrieves information based on metadata game rules. Metadata game rules are rules for retrieving or translating metadata. The rules may be different for different games, different game types, different game versions, and/or any other differences.

The metadata control module 302 may retrieve metadata game rules from the metadata game profile storage 314 based on the metadata (e.g., based on the player device identifier, a player identifier, a game identifier, and/or a game instance identifier). Those skilled in the art will appreciate that the metadata control module 302 may retrieve any number of metadata game rules from the metadata game profile storage 314 based on any information.

Although metadata game rules are described herein to assist the metadata control module 302 identifier and/or select information from the metadata, those skilled in the art will appreciate that the metadata game rules are optional. For example, the metadata may be in a common format and/or the metadata control module 302 may retrieve the desired information from the metadata without game specific metadata game rules.

The metadata game rules may include instructions to assist the metadata control module 302 to interpret or translate the metadata from the player device 200. In various embodiments, the metadata control module 302 receives the metadata from the player device 200 and identifies the trigger satisfaction indicators with or without the metadata game rules.

The annotation generation module 304 generates one or more annotations based on the trigger satisfaction indicators from the metadata control module 302. An annotation is an instruction that may be provided to a media system 116 or any digital device that may alter presentation of gameplay video such as including indications (e.g., game event marker) in a timeline associated with the gameplay video, providing information regarding content associated with one or more indications that may be displayed, labels, titles, balloons, bubbles, or the like. In various embodiments, annotations may be formatted for one or more media systems 116.

In various embodiments, the annotation module 304 identifies the media system 116 based on information from the player device 200 (e.g., from the metadata). The annotation module 304 may generate annotations that can be received by the media system 116. For example, the annotation module 304 may retrieve media system profiles (e.g., from a storage not depicted) which include media system instructions to generate the annotations to be received by the media system 116 (e.g., utilizing the correct API and/or formatting the annotations such that they may be understood by the media system 116).

Those skilled in the art will appreciate that annotations may include instructions to depict indicators at time(s), position(s) or portion(s) in a timeline associated with the video of gameplay on the media system 116 Annotations may further include labels describing events and/or occurrences either in the video or that led to the associated trigger(s) being satisfied and/or player names, titles, balloons with information to depict around or on the video, or hidden information. Annotations may include any information that describes the gameplay video and/or assists with the display of information associated with the gameplay video.

In various embodiments, the annotations include instructions to depict indicators at time(s), position(s) or portion(s) in a timeline. The annotations may be based on the one or more trigger satisfaction indicators in the metadata from the player device 200. Annotations for labels, balloons, and/or titles may also be retrieved from the metadata (e.g., metadata that identifies the trigger that was satisfied and/or the type of trigger, player name, game, game instance, or the like).

The timeline indicator module 306 may adjust timeline indicators (e.g., game event markers associated with the timeline of the video). Those skilled in the art will appreciate that trigger satisfaction may occur immediately after or upon an event occurrence. As a result, an indicator may be associated with a position in the timeline which may be too late for a viewer to view the entire event including pertinent content leading up to the event. In some embodiments, the timeline indicator module 306 adjusts the timeline indicators.

In various embodiments, the timeline indicator module 306 and/or the metadata control module 302 may retrieve timeline adjustment instructions from the metadata game profile. The timeline indicator module 306 may make adjustments to timeline indicators (e.g., instructions for game event markers or trigger satisfaction indicators) based on metadata and the timeline adjustment instructions. For example, the timeline indicator module 306 may determine trigger satisfaction type information associated with a particular trigger satisfaction indicator from the metadata. The timeline adjustment instructions may instruct the timeline indicator module 306 to adjust a timeline indicator (e.g., up a predetermined number of seconds) to better indicate the event.

Those skilled in the art will appreciate that different timeline indicators may need to be adjusted different amounts depending upon the type of event that satisfied the trigger. For example, completing an achievement is often the end of a process (e.g., defeat of an enemy). An indicator at a point in video where the enemy is defeated may not be as interesting as including the process that culminated in the achievement. In this example, the timeline indicator module 306 may position the timeline indicator at a predetermined period of time before the trigger was satisfied to assist a viewer to view more gameplay associated with the event.

In another example, the metadata may provide indications of gameplay prior to satisfaction of a trigger condition which may be utilized by the timeline indicator module 306 to position the timeline indicator of the video. For example, the metadata may indicate that events that led to the achievement began at a specific time. The timeline indicator module 306 may utilize that information to position the timeline indicator. Those skilled in the art will appreciate that timeline indicator module 306 may adjust, position, or reposition timeline indicators based on any information including, but not limited to, user preferences (e.g., received from the player device 200 and stored in the user preferences storage 316), the metadata game profile, the metadata from the player device, or the like.

Those skilled in the art will appreciate that the timeline indicator module 306 may be on the player device. For example, the timeline indicator module 306 may adjust the trigger satisfaction indicator based on, for example, the trigger being satisfied and/or a game profile (e.g., comprising timeline adjustment instructions based on the game, type of game, game version, game instance, and/or information from gameplay).

The annotation editor module 308 may provide an interface and/or tools that allow digital devices access to create instructions to generate annotations. In one example, annotations may be edited by an administrator or other user.

For example, one or more media systems 116 may be configured to receive annotations or other instructions to assist in annotating videos in a specific format or with specific commands. Those skilled in the art will appreciate that different media systems may require different commands and/or formats to allow or assist in allowing annotations in a video. In various embodiments, users (e.g., programmers, administrators, or others) may utilize the annotation editor module 308 to create a media system profile with instructions to generate annotations for a new media system In some embodiments, the annotation editor module 308 may be utilized to annotate existing gameplay video on any number of media systems 116. In various embodiments, the annotation editor module 308 may be utilized to generate metadata game rules for retrieving information from metadata and/or generating annotations.

The media communication module 310 provides the annotations and/or any other information to the media system 116. In various embodiments, the media communication module 310 identifies the media system 116 from information contained in the metadata received from the player device 200 (e.g., the metadata comprises a media server identifier and a gameplay video identifier). In various embodiments, the media communication module 310 retrieves or receives a media system identifier from the player device 200 (e.g., from the metadata). The media communication module 310 may provide the annotations from the annotation generation module 304 based on the media system identifier.

The trigger profile module 312 enables digital devices and/or users to create, update, or modify triggers. For example, an administrator may create, update, or modify triggers associated with a game update or to improve the probability that satisfied triggers may indicate events of interest.

For example, a gaming entity may produce a new game. The gaming entity may identify achievements, goals, and/or objectives in the game. The gaming entity may also generate one or more triggers utilizing the trigger profile module 312 based on all or some of the achievements, goals, and/or objectives to flag those events in gameplay video. In various embodiments, the gaming entity may also generate triggers that are satisfied by occurrences in gameplay. In one example, the gaming entity provides one or more wincodes associated with a game. Each wincode (or a subset of wincodes) may include trigger information or other information that may assist in the generation of triggers when the wincode is generated and/or executed. In one example, some wincodes may indicate that a trigger would not be satisfied upon execution or generation of the wincode. Other wincodes (or a combination of wincodes) may indicate that a trigger would be satisfied.

In various embodiments, trigger information from multiple players and/or viewers may assist in improving which events may be correlated with trigger satisfaction such that a timeline of video is more likely to indicate events of interest. For example, when players manually indicate they wish to flag or indicate a desired occurrence in gameplay, trigger information may be generated to flag the gameplay events at that time. If enough players manually indicate a desire to flag gameplay events in the video, the trigger profile module 312 may generate a trigger defining those occurrences in gameplay as satisfying trigger conditions (e.g., thereby automatically flagging content and rendering manual indication unnecessary).

Similarly, if viewers avoid gameplay video at certain indications or begin to watch gameplay video at a game event marker and then stop (e.g., the viewer goes to a different indication in a gameplay video timeline or the viewer terminates the video), the trigger profile module 312 may modify or delete the related trigger.

Those skilled in the art will appreciate that, over time after assessing player and viewer behavior in the aggregate, triggers may improve such that events of interest are more likely to be flagged (e.g., indicated by gameplay markers).

Similarly, those skilled in the art will appreciate that triggers may be created, modified, or deleted for an individual player based on the player's preferences, player's actions in flagging material while playing and/or a viewer's behavior when watching gameplay video. In various embodiments, each player device may comprise one or more personal trigger profiles which include triggers configured for the player based on the player's actions. In some embodiments, a player may configure their personal trigger profile based on the type of gameplay events that the player wishes to flag.

Although some embodiments describe a player device 200 as providing trigger satisfaction indicators in metadata to allow the processing server 118 to generate annotations for a media system, those skilled in the art will appreciate that the functions may be performed on any digital device. For example, the player device 200 may generate annotations based on the trigger satisfaction indicators. The player device 200 may provide the annotations to the media system 216 before, at the same time, or after gameplay video is provided. In some embodiments, the player device 200 may generate indications at times, positions, or segments of a timeline and provide the video and timeline to any other digital device (e.g., another player device or the media system 116).

In various embodiments, the processing system 118 may receive information (e.g., from the player device) associated with gameplay and may determine if a trigger is satisfied based on occurrences within the gameplay. The processing system 118 may generate annotations based on the trigger satisfaction indicators. The processing system 118 may provide the annotations to the media system 216 before, at the same time, or after gameplay video is provided to the media system 216. In some embodiments, the processing system 118 may generate indications at times, positions, or segments of a timeline and provide the video and timeline to any other digital device (e.g., the player device or the media system 116).

In some embodiments, the processing system 118 is any digital device that may control gameplay. In one example, game logic may be performed in a network system. Control signals from any number of players playing a game may be provided to the processing system 118. The processing system 118 may determine results. Video based on the results and/or any number of control signals may be rendered by the processing system 118 and/or another digital device. The rendered video may be provided to the player device(s), the media system 116, and/or the processing system 118. In this example, the processing system 118, digital device rendering the video, or other digital device may generate annotations based on the trigger satisfaction indicators as discussed herein. The processing system 118, digital device rendering the video, or other digital device may provide the annotations to the media system 216 before, at the same time, or after gameplay video is provided to the media system 216.

The metadata game profile storage 314 and the user preferences storage 316 may comprise any number and any type of storage devices and/or data structures.

Figure 4:
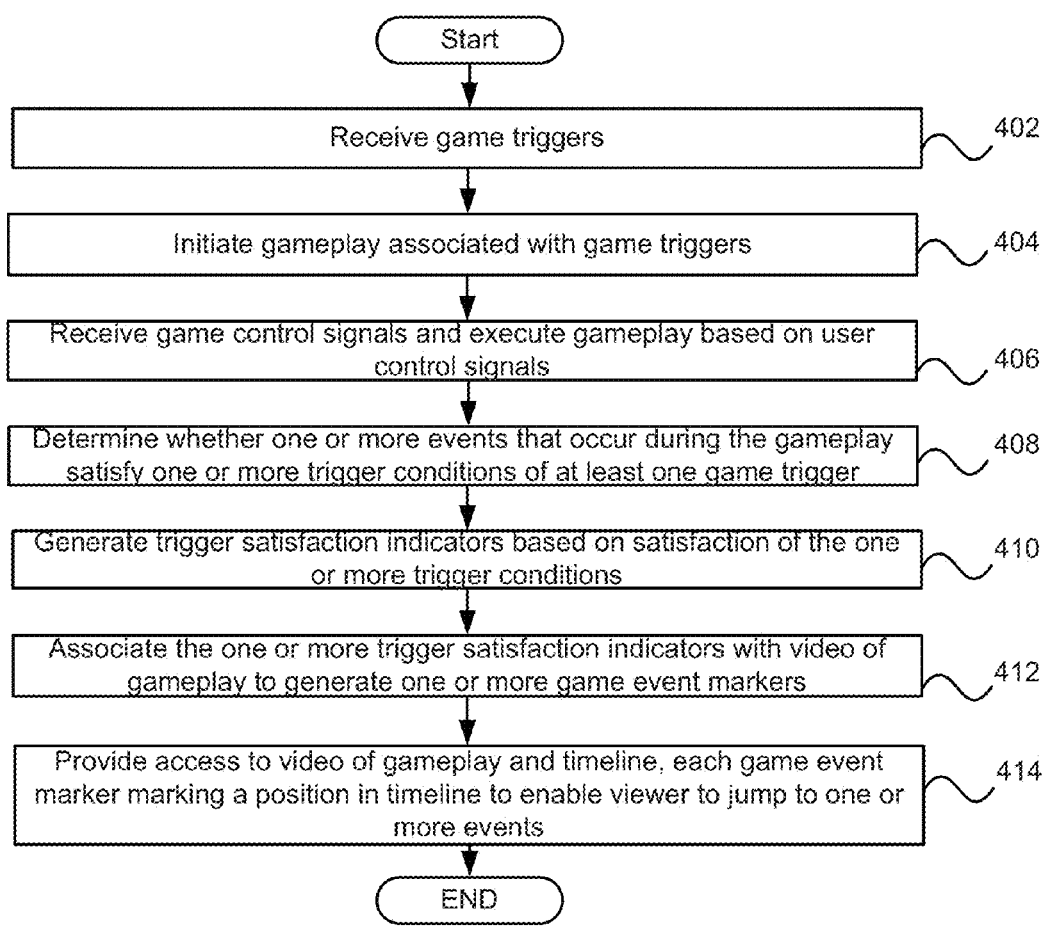
FIG. 4 is a flowchart for broadcasting and identifying content of potential interest in gameplay video in some embodiments.

FIG. 4 is a flowchart for broadcasting and identifying events of potential interest in gameplay video in some embodiments. In step 402, the trigger satisfaction module 214 may receive game triggers. The game triggers received by the trigger satisfaction module 214 may be stored in the game and trigger storage 218.

In one example, when the player device 200 receives a new game (e.g., via download or physical media such as computer readable medium), the new game may include a trigger profile indicating triggers (e.g., each trigger defining trigger conditions). The trigger profile may be available by download or from the computer readable medium. In some embodiments, a trigger profile may be downloaded from a server (e.g., from the processing system 118). Those skilled in the art will appreciate that the trigger profile may be updated or modified to add more triggers or to modify existing triggers to increase likelihood of flagging events of potential interest.

In step 404, the game controller module 202 initiates gameplay associated with game triggers. For example, the game controller module 202 may execute an instance of the game. The game controller module 202 may retrieve a trigger profile associated with the game from the game and trigger storage 218 (e.g., based on a game identifier). The trigger profile may comprise triggers defining trigger conditions that, when satisfied, may trigger a game satisfaction indicator to be associated with time(s), position(s), or portion(s) of gameplay video.

In step 406, the game controller module 202 and/or the interaction module 204 may receive game control signals (e.g., from a joystick or other input device) from any number of players. The game controller module 202 may execute gameplay based on the user control signals. The game control signals may influence gameplay.

In step 408, the trigger satisfaction module 214 may determine whether one or more events that occur during the gameplay satisfy one or more trigger conditions of at least one game trigger. In various embodiments, the trigger satisfaction module 214 monitors gameplay events (e.g., utilizing or monitoring wincodes, achievements or the like). The trigger satisfaction module 214 may determine if the events satisfy one or more trigger conditions. When a trigger's trigger conditions are satisfied (e.g., over time or within a predetermined period of time if there are more than one trigger conditions associated with a single trigger), the trigger satisfaction module 214 may generate a trigger satisfaction indicator in step 410.

The trigger satisfaction module 214 may determine an achievement, goal, objective, meeting, or the like satisfies one or more triggers. The trigger satisfaction module 214 may, in some embodiments, receive a manual indication from a player to generate a trigger satisfaction indicator. The trigger satisfaction indicator may indicate a time, position, or portion of gameplay video associated with the events that generated the video.

In various embodiments, the trigger satisfaction module 214 may modify or adjust one or more trigger satisfaction indicators. In one example, the trigger satisfaction module 214 may detect that events satisfied one or more trigger conditions associated with a trigger. If a trigger satisfaction indicator is associated with a position in gameplay video that satisfied a final trigger condition, the position in gameplay video may be insufficient for a viewer to view an entire event (e.g., from the beginning of the event) or may provide insufficient time to view the event. The trigger satisfaction module 214 may adjust the trigger satisfaction indicator such that the trigger satisfaction indicator is associated with an earlier or later position of the gameplay video.

For example, the trigger satisfaction module 214 may retrieve a trigger profile that may indicate trigger satisfaction indicator adjustments for any number of triggers. When a trigger associated with a trigger satisfaction indicator adjustment is satisfied and a trigger satisfaction indicator is generated, the trigger satisfaction module 214 may retrieve a trigger satisfaction indicator adjustment based on the trigger and adjust the trigger satisfaction indicator. In various embodiments, the player of the player device 200 may perform adjustments manually (e.g., via the interaction module 204). Those skilled in the art will appreciate that upon satisfaction of a trigger, the trigger satisfaction module 214 may, without adjustment, generate a trigger satisfaction indicator associated with a different position (e.g., an earlier position) of gameplay video (e.g., associating a position that occurs earlier than the time that the trigger is satisfied).

In step 412, the trigger satisfaction indicators are associated with gameplay video to generate one or more game event markers. In some embodiments, a metadata generation module 216 provides the trigger satisfaction indicators to a processing system 118 as metadata (e.g., or any data). The metadata generation module 216 may also include a gameplay video identifier and/or an identifier of a media system 116 that provides access to the gameplay video. A metadata control module 302 of the processing system 118 may receive the metadata from the player device 200 and may identify the trigger satisfaction indicators. The annotation generation module 304 may generate annotations to provide to the media system 216 (e.g., based on a media system profile) and the media communication module 310 may provide the annotations to the media system 216. The annotations may include the gameplay video identifier as well as any other information or instructions. The media system 116 may receive the annotations and, based on the annotations and the gameplay video identifier and generate (and/or display) the game event markers in a timeline associated with the gameplay video (e.g., see FIG. 7). Annotations may further include instructions to display a title, links, labels for game event markers, advertisements, or the like.

In step 414, the media system 116 may provide access to gameplay video and the annotated timeline, each game event marker marking a position in the timeline to enable a viewer to jump to one or more events contained in the gameplay video.

Figure 5:
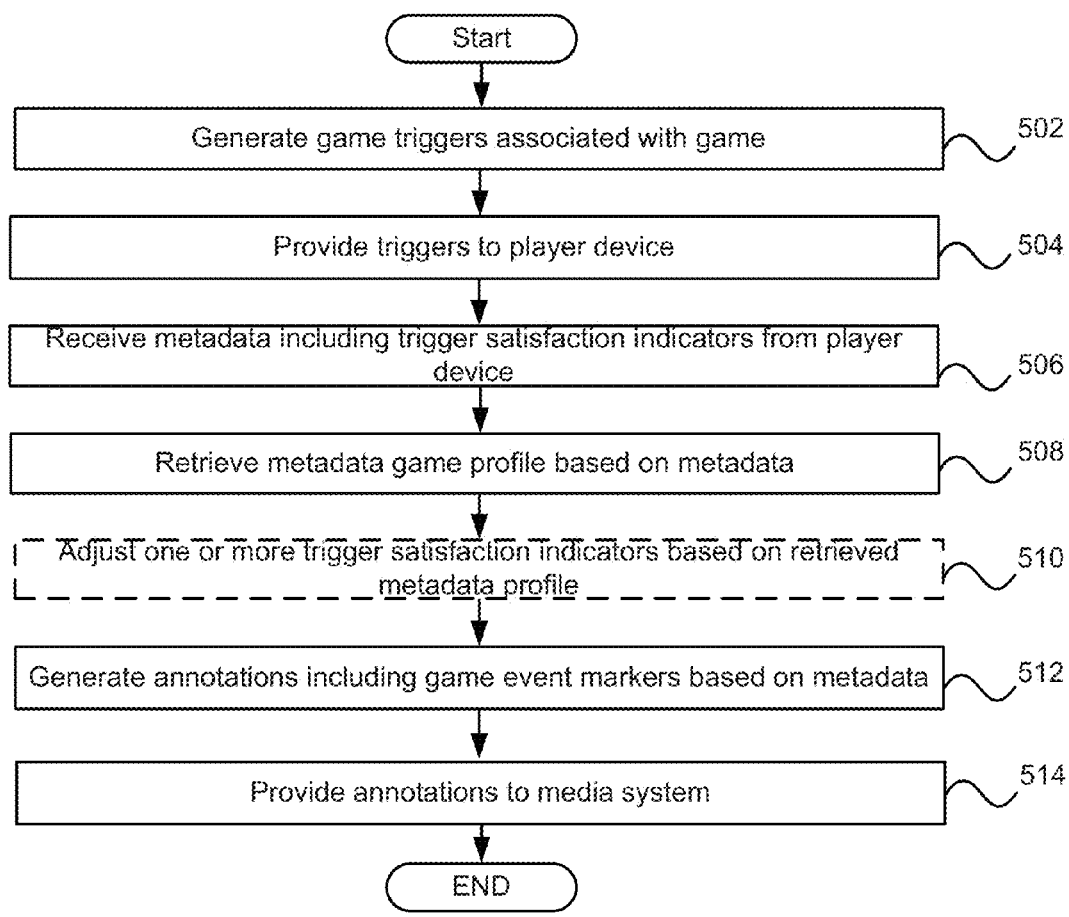
FIG. 5 is a flowchart for generating annotations based on metadata from the player device to indicate events of potential interest in gameplay video in some embodiments.

FIG. 5 is a flowchart for generating annotations based on metadata from the player device 200 to indicate events of potential interest in gameplay video in some embodiments. In step 502, the trigger profile module 312 generates game triggers associated with a game. The trigger profile module 312 may be utilized to generate triggers of a game or group of games (e.g., groups of games that are the same but different versions or editions or groups of games a similar type such as sports games). The trigger profile module 312 may be configured or utilized by a game developer, player, user, administrator, or any digital device.

In step 504, the trigger profile module 312 may send one or more triggers (e.g., a trigger profile associated with a game or a group of games) to the player device 200 or any distribution device (e.g., for downloading or including in computer readable medium with executable code of the game).

In step 506, the metadata control module 302 may receive metadata including trigger satisfaction indicators from player device 200. In various embodiments, a player plays a game utilizing the player device 200 (e.g., utilizing the game controller module 202 and/or the interaction module 204).

The trigger satisfaction module 214 may monitor gameplay and determine if occurrences or events during gameplay satisfy one or more triggers. The trigger satisfaction module 214 and/or the metadata generation module 216 may generate trigger satisfaction indicators associated with satisfied triggers and provide the trigger satisfaction indicators to the metadata control module 302 of the processing system 118.

The processing system 118 may retrieve the trigger satisfaction indicators from the metadata. The processing system 118 may retrieve a metadata game profile from the metadata game profile storage 314 (e.g., retrieval may be based on a game identifier, session identifier, or any other information in the metadata or associated with the metadata) in step 508. The metadata control module 302 may retrieve the trigger satisfaction indicators from the metadata or translate the metadata to generate the trigger satisfaction indicators based on the metadata game profile. In some embodiments, the metadata is compressed and/or encoded (e.g., encrypted or formatted in a proprietary format). The metadata control module 302 may decompress, decrypt, and/or access information (e.g., trigger satisfaction indicators) within the metadata based on the metadata game profile.

In step 510, the timeline indicator module 306 may modify or adjust one or more trigger satisfaction indicators (e.g., associated with timeline indicators or game event markers). As discussed herein, the trigger satisfaction module 214 may detect that events satisfied one or more trigger conditions associated with a trigger. If a trigger satisfaction indicator is associated with a position in gameplay video that satisfied a trigger condition, the position in gameplay video may be insufficient for a viewer to view an entire event (e.g., from the beginning of the event) or may provide insufficient time to view the event. The timeline indicator module 306 may adjust the trigger satisfaction indicator such that the trigger satisfaction indicator is associated with an earlier or later position of the gameplay video. In some embodiments, the timeline indicator module 306 adjusts annotations or the like to adjust the position of the game marker in the timeline of the gameplay video.

In step 512, the annotation generation module 304 generates annotations including game event markers based on metadata. As discussed herein, in some embodiments, a metadata generation module 216 provides the trigger satisfaction indicators to a processing system 118 as metadata (e.g., or any data). The metadata generation module 216 may also include a gameplay video identifier and/or an identifier of a media system 116 that provides access to the gameplay video. A metadata control module 302 of the processing system 118 may receive the metadata from the player device 200 and may identify the trigger satisfaction indicators. The annotation generation module 304 may generate annotations based on the trigger satisfaction indicators (and/or other metadata) to provide to the media system 216 (e.g., based on a media system profile). The annotations may include the gameplay video identifier as well as any other information or instructions. The media system 116 may receive the annotations and, based on the annotations and the gameplay video identifier, generate (and/or display) the game event markers in a timeline associated with the gameplay video (e.g., see FIG. 7). Annotations may further include instructions to display a title, links, labels for game event markers, advertisements, or the like.

In step 514, the media communication module 310 may provide the annotations to the media system 216. In some embodiments, the media communication module 310 retrieves a media system identifier and/or address of the media system 116 from the player device 200 (e.g., from the metadata). The media communication module 310 may also receive a gameplay video identifier from the player device 200. The media communication module 310 may retrieve information regarding communication, format, compression, or any instructions from a media system profile, in some embodiments. The media communication module 310 may, for example, provide the annotations from the annotation generation module 304 to the media system 116 utilizing the media system identifier, address of the media system 116, and/or information from the media system profile.

Figure 6:
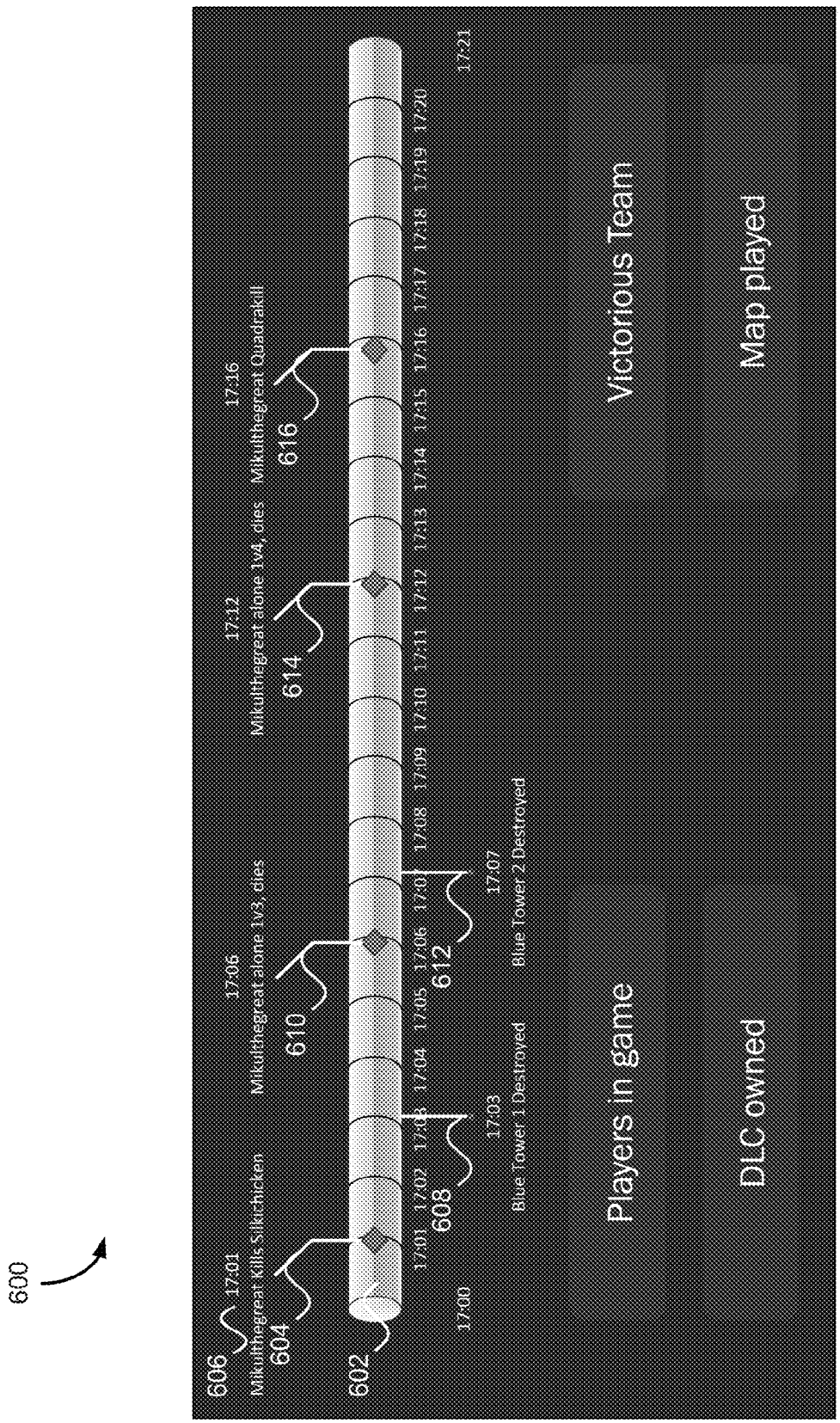
FIG. 6 is a depiction of a timeline associated with a gameplay video in some embodiments.

FIG. 6 is a depiction 600 of a timeline 602 associated with a gameplay video in some embodiments. The timeline 602 may comprise game event marker 604 (as well as others). A game event marker 604 indicates one or more events that occurred during gameplay that satisfied one or more triggers. The game event marker 604 is associated with label 606 ("Mikulthegreat Kills Silkichicken"). Other events are indicated by labels and game marker 608 ("Blue Tower 1 Destroyed"), 610 ("Mikulthegreat alone 1v3, dies"), 612 ("Blue Tower 2 Destroyed"), 614 ("Mikulthegreat alone 1v4, dies"), and 616 ("Mikulthegreat Quadrakill"). Those skilled in the art will appreciate that there may be any number of labels, game markers, titles, colors, or other information. The labels and game markers may be generated by a media system 116 based on annotations from the annotation generation module 304.

In some embodiments, the timeline 602 depicts trigger satisfaction indicators that are to be translated or converted into annotations (e.g., instructions) to be provided to a media system 116 to enable generation of the game markers.

Figure 7:
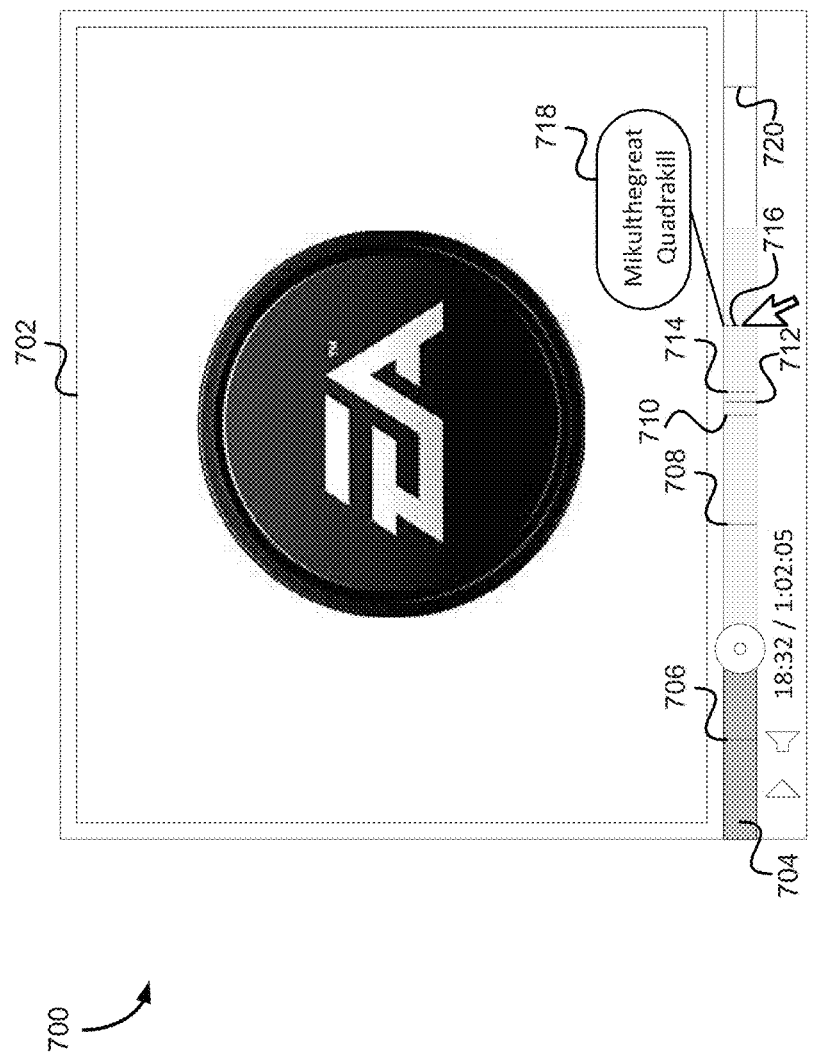
FIG. 7 depicts a video player for gameplay video with a timeline and annotations indicating events of potential interest in some embodiments

FIG. 7 depicts a video player 700 for gameplay video 702 with a timeline 704 and annotations indicating events of potential interest in some embodiments. The video player 700 may be executed on or provided to a player device 200 by the media system 116. In some embodiments, the video player 700 is executed on the player device 200 and the media system 116 provides access to and/or downloads (or streams) the gameplay video 702.

The media system 116 may receive the annotations from the processing system 118 to generate the game event markers 706, 708, 710, 712, 714, 716, and 720. There may be any number of game event markers. The media system 116 may also receive annotation(s) from the processing system 118 to provide labels or other information to be displayed. In this example, each game event marker may be associated with a label that remains hidden until a mouse pointer or cursor engages (e.g., hovers over or clicks) the game event marker. The label 718 ("Mikulthegreat Quadrakill") is associated with game marker 716.

Those skilled in the art will appreciate that annotations (e.g., labels and game markers) may be modified in some embodiments. For example, in some embodiments, a player or digital device with sufficient rights may add, remove, or modify annotations (e.g., either on the player device or utilizing the processing system 118. In one example, a player may remove some game event markers that flag events that are not considered to be interesting but may add some markers in different positions of the gameplay video (e.g., utilizing the annotation editor module 308 on the processing system 118 and/or the player device 200).

Figure 8:
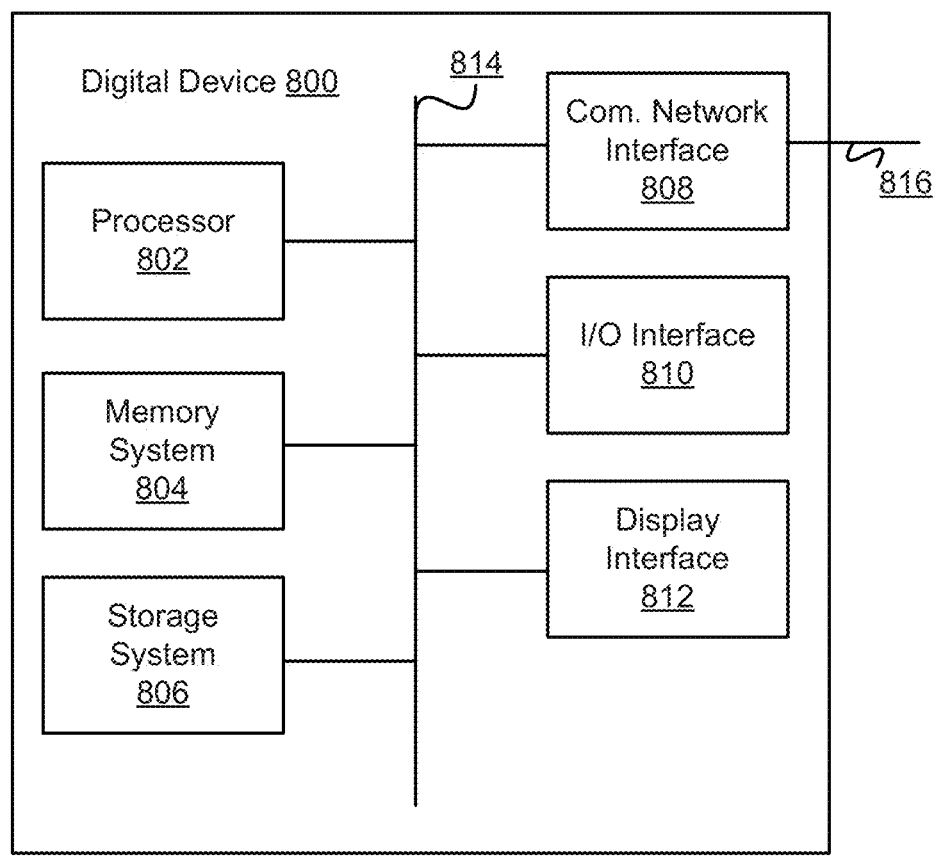
FIG. 8 is a block diagram of an exemplary digital device.

FIG. 8 is a block diagram of an exemplary digital device 800. The digital device 800 comprises a processor 802, a memory system 804, a storage system 806, a communication network interface 808, an I/O interface 810, and a display interface 812 communicatively coupled to a bus 814. The processor 802 is configured to execute executable instructions (e.g., programs). In some embodiments, the processor 802 comprises circuitry or any processor capable of processing the executable instructions.

The memory system 804 is any memory configured to store data. Some examples of the memory system 804 are storage devices, such as RAM or ROM. The memory system 804 can comprise the ram cache. In various embodiments, data is stored within the memory system 804. The data within the memory system 804 may be cleared or ultimately transferred to the storage system 806.

The storage system 806 is any storage configured to retrieve and store data. Some examples of the storage system 806 are flash drives, hard drives, optical drives, and/or magnetic tape. In some embodiments, the digital device 800 includes a memory system 804 in the form of RAM and a storage system 806 in the form of flash data. Both the memory system 804 and the storage system 806 comprise computer readable media which may store instructions or programs that are executable by a computer processor including the processor 802.

The communication network interface (com. network interface) 808 can be coupled to a network (e.g., communication network 102) via the link 816. The communication network interface 808 may support communication over an Ethernet connection, a serial connection, a parallel connection, or an ATA connection, for example. The communication network interface 808 may also support wireless communication (e.g., 802.11 a/b/g/n, WiMax). It will be apparent to those skilled in the art that the communication network interface 808 can support many wired and wireless standards.

The optional input/output (I/O) interface 810 is any device that receives input from the user and output data. The optional display interface 812 is any device that is configured to output graphics and data to a display. In one example, the display interface 812 is a graphics adapter. It will be appreciated that not all digital devices 800 comprise either the I/O interface 810 or the display interface 812.

It will be appreciated by those skilled in the art that the hardware elements of the digital device 800 are not limited to those depicted in FIG. 8. A digital device 800 may comprise more or less hardware elements than those depicted. Further, hardware elements may share functionality and still be within various embodiments described herein. In one example, encoding and/or decoding may be performed by the processor 802 and/or a co-processor located on a GPU (i.e., Nvidia).

Figure 9:
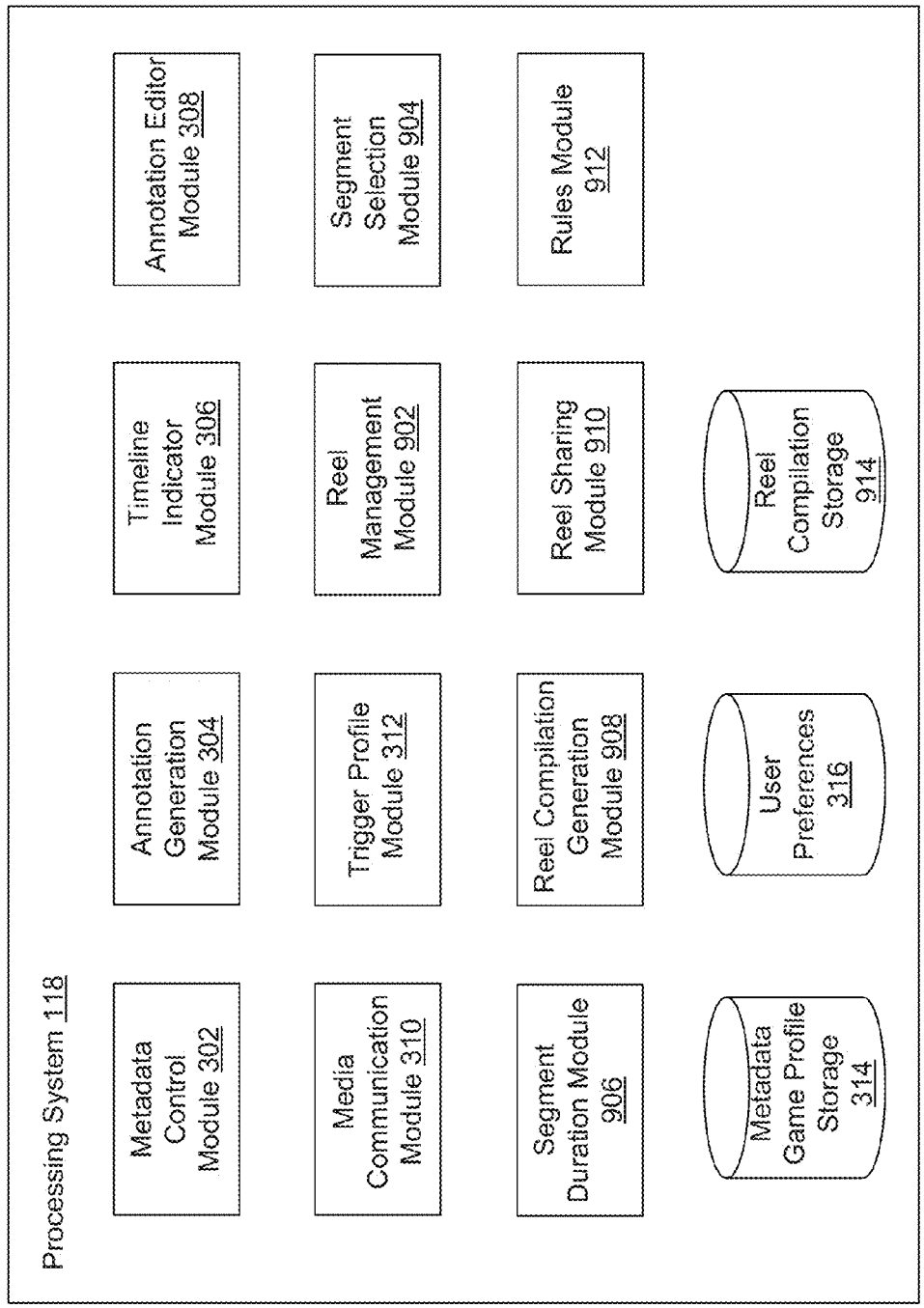
FIG. 9 is a block diagram of a processing system in some embodiments.

FIG. 9 is a block diagram of a processing system 118 in some embodiments. The processing system 118 may include all, some, or none of the components depicted and described regarding FIG. 3 including a metadata control module 302, an annotation generation module 304, a timeline indicator module 306, an annotation editor module 308, a media communication module 310, a trigger profile module 312, a metadata game profile storage 314, and a user preferences storage 316. The processing system 118 may further comprise a reel management module 902, a segment selection module 904, a segment duration module 906, a reel compilation generation module 908, a reel sharing module 910, a rules module 912, an a reel compilation storage 914.

As described in FIG. 3, the metadata control module 302 may receive metadata from the player device 200 (e.g., from the metadata generation module 216). The metadata may comprise any kind of information. In some embodiments, the metadata may comprise a player device identifier, a player identifier, a game identifier, a game instance identifier, a video identifier, and/or a media system identifier. In some embodiments, the metadata control module 302 may retrieve trigger satisfaction indicators or any other information from the metadata. In one example, the metadata control module 302 identifies and retrieves information based on metadata game rules.

The annotation generation module 304 generates one or more annotations based on the trigger satisfaction indicators from the metadata control module 302. In various embodiments, the annotation module 304 identifies the media system 116 based on information from the player device 200 (e.g., from the metadata). The annotation module 304 may generate annotations that can be received by the media system 116. Those skilled in the art will appreciate that annotations may include instructions to depict indicators at time(s), position(s) or portion(s) in a timeline associated with the video of gameplay on the media system 116. Annotations may further include labels describing events and/or occurrences either in the video or that led to the associated trigger(s) being satisfied and/or player names, titles, balloons with information to depict around or on the video, or hidden information. Annotations may include any information that describes the gameplay video and/or assists with the display of information associated with the gameplay video.

The timeline indicator module 306 may adjust timeline indicators (e.g., game event markers associated with the timeline of the video). In various embodiments, the timeline indicator module 306 and/or the metadata control module 302 may retrieve timeline adjustment instructions from the metadata game profile. The timeline indicator module 306 may make adjustments to timeline indicators based on metadata and the timeline adjustment instructions.

The annotation editor module 308 may provide an interface and/or tools that allow digital devices access to create instructions to generate annotations. In one example, annotations may be edited by an administrator or other user. For example, one or more media systems 116 may be configured to receive annotations or other instructions to assist in annotating videos in a specific format or with specific commands.

The media communication module 310 provides the annotations and/or any other information to the media system 116. In various embodiments, the media communication module 310 identifies the media system 116 from information contained in the metadata received from the player device 200 (e.g., the metadata comprises a media server identifier and a gameplay video identifier). In various embodiments, the media communication module 310 retrieves or receives a media system identifier from the player device 200 (e.g., from the metadata). The media communication module 310 may provide the annotations from the annotation generation module 304 based on the media system identifier.

The trigger profile module 312 enables digital devices and/or users to create, update, or modify triggers. For example, an administrator may create, update, or modify triggers associated with a game update or to improve the probability that satisfied triggers may indicate events of interest.

The metadata game profile storage 314 and the user preferences storage 316 may comprise any number and any type of storage devices and/or data structures.

The reel management module 902 controls generation of the compilation reel. A reel is a compilation of portions from a single video or from multiple videos. In one example, a reel comprises a compilation of portions of a gameplay video (e.g., available via the media system 116).

In various embodiments, the reel management module 902 selects a reel type to generate. A reel type refers to a category or class of a compilation reel. Categories may include a highlight reel, a story reel, or any other group of events that are shown in gameplay of one or more videos by any number of players. A highlight reel may comprise gameplay segments that highlight achievements and accomplishments. A story reel may comprise gameplay segments that summarize the overall story of gameplay (e.g., highlights a summary of a game in sports or the timeline of a story arc of gameplay in an RPG game). There may be any number of categories (i.e., there may be any number of reel types).

In various embodiments, the reel management module 902 may generate a multiple player reel and/or a multiple video reel. For example, the reel management module 902 may be configured to select portions of one or more videos featuring gameplay of different players (e.g., in a multiplayer game). Examples include achievement of different player, multiplayer interactions (e.g., a first player beats a different player in a sports game, takes a headshot in a military shooter game, or cooperation of multiple players to complete a puzzle or escape a trap).

The reel management module 902 may receive instructions to automatically create any number of compilation reels based on the compilation rules. Compilation rules may define any number of different compilation reels. In one example, a game developer or publisher may provide compilation rules to generate a compilation reel of gameplay of a particular game. The game developer or publisher may define the desired compilation reel by providing instructions regarding a compilation reel type and selection of portions of one or more gameplay videos. The processing system 118 may generate the compilation reel at any time.

In various embodiments, compilation rules may be modified based on views by viewers. If some compilation reel types are not popular, the compilation rules may be altered to reduce the number of unpopular compilation reels. Similarly, if there is great interest in a new game (e.g., TitanFall™), then compilation rules may be modified to increase the number of compilation reels and/or the selection of portions of gameplay video based on the viewership. Similarly, if a portion of a compilation reel is not popular, the compilation rules may be modified to reduce or eliminate the probability that the type of unpopular video will be selected.

In various embodiments, the reel management module 902 may receive a compilation reel request from a player (e.g., via the player device 200). The player may select video portions for including in the composition reel or may provide a type of video portions to be included in the composition reel. In one example, the player may provide a series of manual trigger satisfaction indications (e.g., selected by the player manually) and/or other trigger satisfaction indications to indicate portions of gameplay video to include in the compilation reel.

Those skilled in the art will appreciate that compilation reels may be generated in real time (e.g., as gameplay video is made available to the processing system 118 and/or other digital devices such as the media system 116). Compilation reels may also be generated based on any number of existing gameplay videos.

The segment selection module 904 may select portions of video to include in a compilation reel. In various embodiments, the segment selection module 904 may base selection on the compilation rules.

In various embodiments, segments of video are associated with a type identifier, rank, and/or a weight. A type identifier may identify the type of event in a portion of gameplay video that satisfied one or more triggers. For example, a type identifier may identify portions of the gameplay video that include events that satisfy achievements. Another type identifier may identify portions of the gameplay video that include events that satisfy accomplishments (e.g., completing a scene, puzzle, set in sport, or the like). Other types of identifier may include meeting other players in gameplay, defeats, successes, jumps, flips, or any other groups of events.

A rank is an indication of the desirability to include a portion of the gameplay video based on the event in gameplay that satisfied one or more triggers. A rank may be established by a game developer, player, or administrator and may be associated with a trigger. In one example, a trigger associated with a high rank will likely be included by the segment selection module 904 in a compilation reel.

A weight is an indication of the relative significance of the event in gameplay that satisfied one or more triggers. Like the rank, a weight may be established by a game developer, player, or administrator and may be associated with a trigger. In one example, a trigger associated with a high weight will likely be included by the segment selection module 904 when the segment selection module 904 is selecting between several portions of gameplay video with similar rank.

In various embodiments, each trigger may be associated with a type identifier, rank, and/or a weight. The trigger may be configured by the trigger profile module 312 and provided to the player device 200. In one example, the trigger satisfaction module 214 and/or the metadata generation module 216 may associate each trigger satisfaction indicator with a type identifier, rank, and/or a weight based on the trigger that was satisfied. In another example, the metadata control module 302 may receive metadata from the player device, retrieve the trigger satisfaction indicator and associate each trigger satisfaction indicator with a type identifier, rank, and/or a weight based on the trigger that was satisfied (e.g., from compilation rules).

In some embodiments, a game developer or other may associate achievements, wincodes, and the like with a type identifier, rank, and/or weight. Triggers with trigger conditions that are satisfied based on achievements, wincodes, or the like may be associated with the type identifier, rank, and/or weight.

The segment selection module 904 may select segments from any number of gameplay video based on any information. In some embodiments, the reel management module 902, based on the compilation rules, instructs the segment selection module 904 to select portions of a specific gameplay video (or a group of gameplay videos). The reel management module 902 may instruct the segment selection module 904 to select a set of portions of gameplay video based on type identifier, rank, and/or weight. The reel management module 902 may also limit selections by the segment selection module 904 to a number of selected portions of gameplay video (e.g., limited to a predetermined number of portions of gameplay video and/or limited to an overall length of time for the compilation reel). In some embodiments, the reel management module 902 may limit selections by the segment selection module 904 to a portions of gameplay video that are equal, less than, or more than a duration of time.

In various embodiments, the segment selection module 904 may also determine an order of selected segments to include in the compilation reel. The segment selection module 904 may, for example, order selected segments based on type, rank, and/or weight.

The segment duration module 906 may create portions of gameplay video based on trigger satisfaction indicators and/or game markers in a timeline. In various embodiments, the timeline indicator module 306 and/or the segment duration module 906 may retrieve timeline adjustment instructions and/or duration instructions (e.g., a start time and an end time associated with each trigger) from the metadata game profile and/or compilation rules. The timeline indicator module 306 and/or the segment duration module 906 may determine a start time for the portion and an end time of the duration based on metadata and the timeline adjustment instructions. For example, the timeline indicator module 306 and/or the segment duration module 906 may determine trigger satisfaction type information associated with a particular trigger satisfaction indicator from the metadata. The timeline adjustment instructions may instruct the timeline indicator module 306 and/or the segment duration module 906 to adjust a start time and an end time (e.g., to a range of a predetermined number of seconds) to include the event associated with the trigger in the portion of gameplay video.

Those skilled in the art will appreciate that different start time and end times may need to be created or adjusted by different amounts depending upon the type of event that satisfied the trigger. The segment duration module 906 may set the start time and/or end time at different times depending upon the event. In some embodiments, some triggers may require a portion of gameplay video with a longer duration than others to better capture the associated event in gameplay.

In another example, the metadata may provide indications of gameplay prior to satisfaction of a trigger condition which may be utilized by the timeline indicator module 306 and/or the segment duration module 906 to position the start time and/or end time of the portion of gameplay video. For example, the metadata may indicate that events that led to the achievement began at a specific time. The timeline indicator module 306 and/or the segment duration module 906 may utilize that information to position the start time and/or end time. Those skilled in the art will appreciate that timeline indicator module 306 and/or the segment duration module 906 may create, adjust, position, or reposition start times and/or end times based on any information including, but not limited to, user preferences, the metadata game profile, the metadata from the player device, compilation rules, or the like.

Those skilled in the art will appreciate that the timeline indicator module 306 may be on the player device. For example, the timeline indicator module 306 may adjust the trigger satisfaction indicator based on, for example, the trigger being satisfied and/or a game profile (e.g., comprising timeline adjustment instructions based on the game, type of game, game version, game instance, and/or information from gameplay).

In various embodiments, the segment duration module 906 determines durations (e.g., start times and end times) associated with trigger satisfaction indicators and/or game markers for segments (e.g., portions of gameplay video) selected by the segment selection module 904. For example, once the segment selection module 904 determines which trigger satisfaction indicators and/or game markers associated with gameplay video are to be included in a compilation reel, the segment duration module 906 may determine the start times and end times for those selected trigger satisfaction indicators and/or game markers. In some embodiments, the segment duration module 906 may determine the start times and/or end times (e.g., duration) of any or all trigger satisfaction indicators and/or game markers.

The reel compilation generation module 908 may generate the compilation reel based on the selections from the segment selection module 904 and instructions from the reel management module 902. In some embodiments, the reel compilation generation module 908 may compile a series of links to different portions of gameplay video to generate the compilation reel. In various embodiments, the reel compilation generation module 908 may retrieve or generate instructions to copy portions of gameplay video to generate the compilation reel. For example, the reel compilation generation module 908 may copy portions of the selected gameplay video from the media system 116 to the processing system 118 to generate the compilation reel. The compilation generation module 908 may provide the compilation reel to any digital device (e.g., back to the media system 116 or any other digital device). The compilation generation module 908 may, in another example, generate instructions to the media system 116 or any other digital device to combine the selected portions of gameplay video to generate the compilation reel.

The reel sharing module 910 may control sharing of the compilation reel and/or any gameplay video. In some embodiments, the player device 200 may provide (e.g., in the metadata) sharing instructions which may indicate that all or part of a gameplay video or compilation reel that is not to be shared, is to be shared with a selected number of people or digital devices (e.g., those who engaged in a multiplayer game), is not to be shared with a selected number of people or digital devices, shared with one or more social networks, or the like. The reel sharing module 910 may also receive instructions to encrypt the gameplay video or compilation reel or require password access. In some embodiments, the reel sharing module 910 may receive instructions to provide the gameplay video or the compilation reel to one or more digital devices. Based on the instructions, the reel sharing module 910 may control access and/or sharing. In one example, the reel sharing module 910 may generate instructions to the media system 116 to restrict access or control sharing to gameplay video(s) and/or a compilation reel(s).

The rules module 912 may create, modify, or delete compilation rules. The compilation rules may govern the types of compilation reels to be generated, the selection of portions of gameplay video, the duration of portions of gameplay video to be included in the compilation reel, generation of the compilation reel, sharing of the compilation reel, and the like as described herein, for example. In some embodiments, the rules module 912 may store the compilation rules in the reel compilation storage 914.

Like the metadata game profile storage 314 and the user preferences 316, the reel compilation storage 914 may comprise any number and any type of storage devices and/or data structures.

Figure 10:
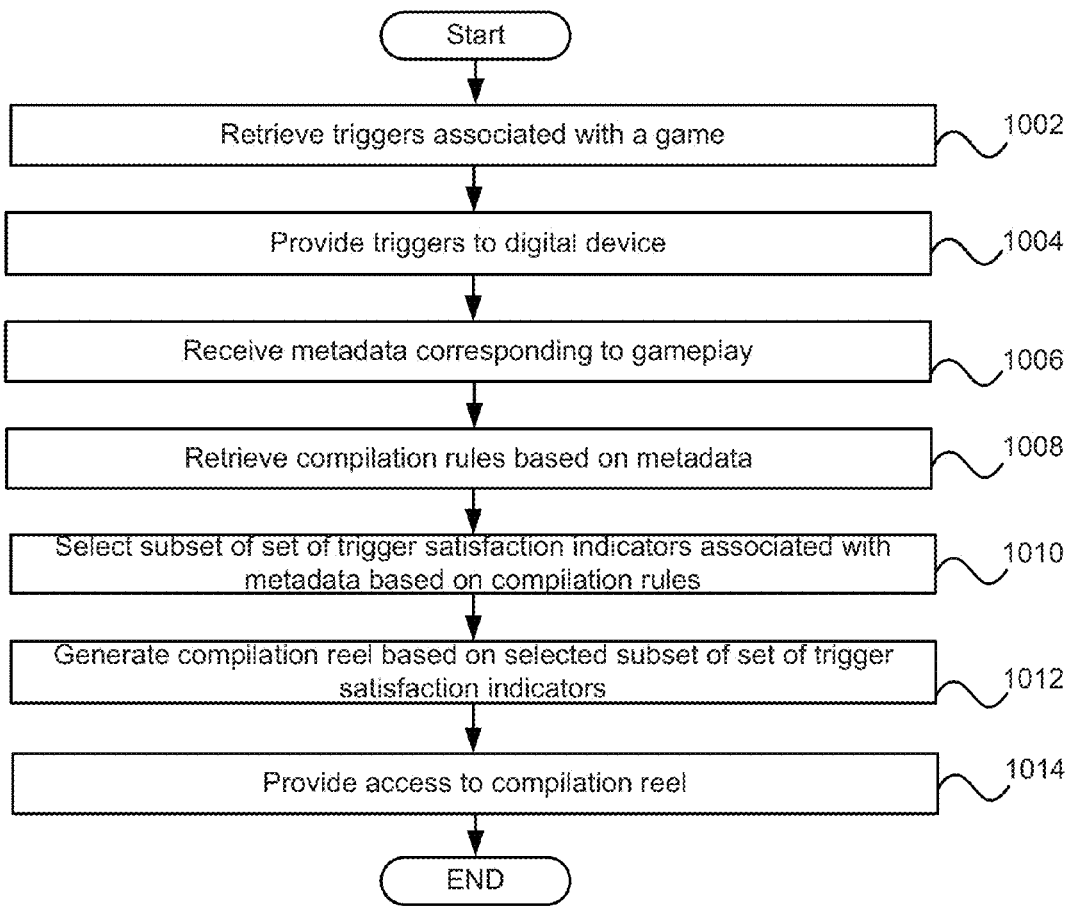
FIG. 10 is a flowchart for generating a compilation reel in some embodiments.

FIG. 10 is a flowchart for generating a compilation reel in some embodiments. In step 1002, the trigger profile module 312 retrieves triggers associated with a game. Each trigger and/or trigger condition may be associated with a type identifier, rank, and/or a weight. In step 1004, the trigger profile module 312 may provide the triggers to the player device 200 (or any digital device).

In step 1006, the metadata control module 302 receives metadata from a player device 200 corresponding to gameplay of the game. The metadata control module 302 may retrieve a video identifier, media system identifier, trigger satisfaction indicators, or any other information from the metadata control module 302 (e.g., optionally utilizing metadata game profile information from the metadata game profile storage 314).

In step 1008, the reel management module 902 may retrieve a set of compilation reel rules based on the metadata (e.g., based on the game identifier or any other information associated with the metadata). The reel management module 902 may retrieve, in some embodiments, instructions regarding the type of compilation reel to create. The instructions regarding the type of compilation reel may be based on information from the player device, the compilation rules, or any other device or information.

In step 1010, the segment selection module 904 may select a subset of a set of trigger satisfaction indicators associated with the metadata. The selection by the segment selection module 904 may be based on the compilation rules. The segment selection module 904 may select any number of trigger satisfaction indicators based on the compilation rules and/or the type of compilation reel provided by the reel management module 902. At least one embodiment for segment selection is discussed regarding FIG. 11. Those skilled in the art will appreciate that although FIG. 10 describes a process of generating a compilation reel based on portions of a single gameplay video, any number of portions from any number of gameplay videos may be included in a compilation reel.

In step 1012, the reel compilation generation module 908 may retrieve segments (e.g., portions) of recorded gameplay video based on selections of the trigger satisfaction indicators and instructions from the reel management module 902. In various embodiments, the reel compilation generation module 908 may retrieve or generate instructions to copy portions of gameplay video to generate the compilation reel.

In step 1014, the reel sharing module 910 may control sharing of the compilation reel and/or any gameplay video. In some embodiments, the player device 200 may provide sharing instructions. The reel sharing module 910 may also receive instructions to encrypt the gameplay video or compilation reel or require password access. Based on the instructions, the reel sharing module 910 may control access and/or sharing. In one example, the reel sharing module 910 may generate instructions to the media system 116 to restrict access or control sharing to gameplay video(s) and/or a compilation reel(s).

Figure 11:
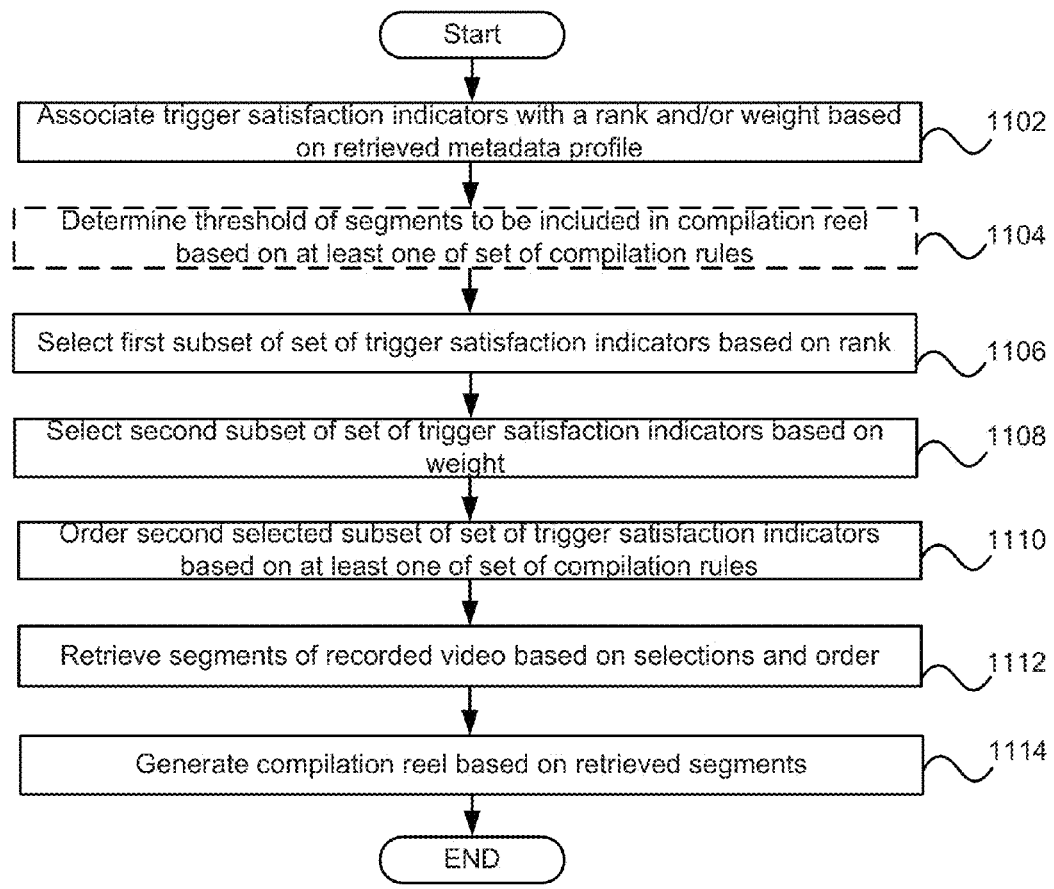
FIG. 11 is a flowchart for selecting portions of gameplay video for inclusion in a compilation reel in some embodiments.

FIG. 11 is a flowchart for selecting portions of gameplay video for inclusion in a compilation reel in some embodiments. In step 1102, trigger satisfaction indicators are associated with a rank and/or weight based on a metadata profile (e.g., from the metadata game profile storage 314). In some embodiments, the metadata control module 302 receives metadata including trigger satisfaction indicators from a player device 200. The metadata control module 302 may identify the types of triggers associated with the trigger satisfaction indicators (e.g., via trigger identifiers in the metadata) and may associate the trigger satisfaction indicators with a rank and/or weight based on the metadata profile.

In some embodiments, the metadata control module 302 associates the trigger satisfaction indicators with a rank and/or weight based on the trigger identifiers and/or game identifiers in the metadata. In one example, the rank and/or weight for similar triggers (e.g., with similar trigger conditions) may be different depending upon the game (different rank and/or weight for different games) or for a game setting (e.g., difficult, medium, or easy game settings). Those skilled in the art will appreciate that the player device 200 may associate all or some of the trigger satisfaction indicators with a rank and/or weight and may provide the rank and/or weight as metadata to the processing system 118.

In optional step 1104, the reel management module 902 may determine a limit or threshold for segments to be included in compilation reel based on at least one set of compilation rules. In one example, the reel management module 902 may receive instructions and/or define the composition reel to be created. The reel management module 902 may determine the number of portions of gameplay video (e.g., segments) to include in a composition reel based on a predetermined number from the compilation reel, an available time for the compilation, the available segments, and/or the like.

In step 1106, the segment selection module 904 selects a first subset of a set of trigger satisfaction indicators based on rank. Each trigger satisfaction indicator may be associated with a rank as described herein. The rank may indicate the importance of including events associated with the trigger satisfaction indicator in the compilation reel.

Each trigger satisfaction indicator may have multiple ranks for different types of compilation reels. For example, a highlight reel (e.g., a reel comprising only the most significant events) may not include a specific event (such as an important meeting with another character during the game) and, as a result, the trigger satisfaction indicator may be associated with a low rank for the highlight reel. In another example, a story reel (e.g., a reel comprising story elements of gameplay) may include the same specific event associated with a very high rank. In some embodiments, triggers and/or trigger conditions may be associated with any number of ranks, each rank associated with one or more different reel compilation types.

In step 1108, the segment selection module 904 selects a second subset of a set of trigger satisfaction indicators based on rank. The second subset may be a subset of the selected trigger satisfaction indicators (e.g., the selection being based on rank). Each trigger satisfaction indicator may be associated with a weight as described herein.

Each trigger satisfaction indicator may have multiple weights for different types of compilation reels. For example, a highlight reel may not include a specific event when the weight of that event is compared to others that may also be included in the highlight reel. In one example, the segment selection module 904 may only select a number of segments (e.g., below a threshold or based on a predetermined number of segments). A specific event may be associated with a significant weight, but the weight may be below the weight of other events that may be included in the highlight reel.

In step 1110 the segment selection module 904 may optionally order the second subset of the trigger satisfaction indicators based on at least one of the set of compilation rules. In some embodiments, the segment selection module 904 may order to the selected trigger satisfaction indicators (or segments) of the second subset based on rank and then weight. In various embodiments, the segment selection module 904 may order to the selected trigger satisfaction indicators of the second subset based on weight. Those skilled in the art will appreciate that the segment selection module 904 may order the second subset of the trigger satisfaction indicators in any number of ways.

In step 1112, the reel compilation generation module 908 may retrieve segments of recorded video (e.g., gameplay video) from media system 116 based on selections and order. In various embodiments, the reel compilation generation module 908 may retrieve or generate instructions to copy portions of gameplay video to generate the compilation reel.

In step 1114, the reel compilation generation module 908 may generate the compilation reel based on the retrieved segments. The reel compilation generation module 908 may provide the compilation reel to the media system 116 and/or any digital device. In some embodiments, the reel sharing module 910 may control sharing of the compilation reel and/or any gameplay video.

Figure 12:
FIG. 12 depicts a video player with a compilation in some embodiments

FIG. 12 depicts a video player with a compilation in some embodiments. FIG. 12 depicts a video player 1200 for a compilation reel 1202 with a timeline 1204 and annotations indicating events of potential interest in some embodiments. The compilation reel 1202 may comprise any number of segments including segment 1206, 1208, 1210, and 1212. Each of the segments 1206, 1208, 1210, and 1212 may be from one or more gameplay videos. The compilation reel 1202 may be provided by the media system 116. In some embodiments, the compilation reel 1202 is played or performed on the player device 200 and the media system 116 provides access to and/or downloads (or streams) the compilation reel 1202.

The media system 116 may receive the annotations from the processing system 118 to generate the game event markers separating segments 1206, 1208, 1210, and 1212. There may be any number of segments and/or game event markers. One or more of the game event marker may be associated with an end time 1216 of a segment 1210 and/or a start time 1218 of a different segment (e.g., segment 1212).

The media system 116 may also receive annotation(s) from the processing system 118 to provide labels, such as label 1214 ("Mikulthegreat Quadrakill") or other information to be displayed. In this example, each game event marker and/or segment (e.g., segment 1212) may be associated with a label that remains hidden until a mouse pointer or cursor engages (e.g., hovers over or clicks) the game event marker and/or segment. Other game event markers and/or segments may also display labels that may or may not be hidden.

Those skilled in the art will appreciate that annotations (e.g., labels and game markers) may be modified for the compilation reel in some embodiments. For example, in some embodiments, a player or digital device with sufficient rights may add, remove, or modify annotations (e.g., either on the player device or utilizing the processing system 118). In one example, a player may remove some game event markers that flag events that are not considered to be interesting but may add some markers in different positions of the gameplay video (e.g., utilizing the annotation editor module 308 on the processing system 118 and/or the player device 200).

The above-described functions and components can be comprised of instructions that are stored on a storage medium such as a computer readable medium. The instructions can be retrieved and executed by a processor. Some examples of instructions are software, program code, and firmware. Some examples of storage medium are memory devices, tape, disks, integrated circuits, and servers. The instructions are operational when executed by the processor to direct the processor to operate in accord with embodiments of the present invention. Those skilled in the art are familiar with instructions, processor(s), and storage medium.

The present invention is described above with reference to exemplary embodiments. It will be apparent to those skilled in the art that various modifications may be made and other embodiments can be used without departing from the broader scope of the present invention. Therefore, these and other variations upon the exemplary embodiments are intended to be covered by the present invention.

The invention claimed is:

1. A system comprising:
a memory comprising a set of compilation reel rules; and
a processor configured to execute instructions which, when executed, cause the processor to:
receive metadata corresponding to gameplay on a digital device, the metadata including a set of trigger indicators associated with a set of gameplay events occurring during the gameplay, the set of trigger indicators being based on a set of trigger conditions occurring during the gameplay, wherein each trigger condition is associated with a weight indicative of a relative significance of a corresponding gameplay event that satisfied the trigger condition;
select a subset of the set of trigger indicators based on the set of compilation reel rules and based on the weight associated with the trigger conditions corresponding to the subset of the set of trigger indicators; and
generate a compilation reel based on the subset of trigger indicators, the compilation reel including video of the gameplay events that occurred during the gameplay corresponding to the subset of trigger indicators.

2. The system of claim 1, wherein at least one of the set of trigger conditions is satisfied by at least one of the set of gameplay events.

3. The system of claim 1, wherein the compilation reel comprises two or more segments from at least one video recording of the gameplay.

4. The system of claim 1, wherein the compilation reel comprises two or more links to at least one video recording of the gameplay.

5. The system of claim 1, wherein at least one of the compilation reel rules require selection of the subset of the set of trigger indicators be based, at least in part, on the metadata.

6. The system of claim 1, wherein the processor is further caused to identify a start time and determine an end time of at least one segment of a video recording of the gameplay.

7. The system of claim 6, wherein the at least one segment corresponds to at least one of the subset of trigger indicators.

8. The system of claim 6, wherein the video of the gameplay events corresponding to the subset of trigger indicators comprises the video of the gameplay events including the at least one segment of the video recording of the gameplay.

9. The system of claim 1, wherein the processor is further caused to provide at least one trigger to the digital device, the trigger being satisfied by at least one of the set of trigger conditions occurring during the gameplay.

10. The system of claim 1, wherein the metadata includes at least one category of at least one of the set of trigger indicators.

11. The system of claim 10, wherein selecting the subset of the set of trigger indicators based on the set of compilation reel rules comprises selecting the subset of the set of trigger indicators based, at least in part, on the at least one category.

12. A method comprising:
receiving metadata corresponding to gameplay on a digital device, the metadata including a set of trigger indicators associated with a set of gameplay events occurring during the gameplay, the set of trigger indicators being based on a set of trigger conditions occurring during the gameplay, wherein each trigger condition is associated with a weight indicative of a relative significance of a corresponding gameplay event that satisfied the trigger condition;

retrieving a set of compilation reel rules;

selecting a subset of the set of trigger indicators based on the set of compilation reel rules and based on the weight associated with the trigger conditions corresponding to the subset of the set of trigger indicators; and generating a compilation reel based on the selected subset of trigger indicators, the compilation reel including video of the gameplay events that occurred during the gameplay corresponding to the subset of trigger indicators.

13. The method of claim 12, wherein at least one of the set of trigger conditions is satisfied by at least one of the set of gameplay events.

14. The method of claim 12, wherein the compilation reel comprises two or more segments from at least one video recording of the gameplay.

15. The method of claim 12, wherein the compilation reel comprises two or more links to at least one video recording of the gameplay.

16. The method of claim 12, wherein at least one of the compilation reel rules require selection of the subset of the set of trigger indicators be based, at least in part, on the metadata.

17. The method of claim 12, further comprising identifying a start time and determining an end time of at least one segment of a video recording of the gameplay.

18. The method of claim 17, wherein the at least one segment corresponds to at least one of the subset of trigger indicators.

19. The method of claim 17, wherein the video of the gameplay events corresponding to the subset of trigger indicators comprises the video of gameplay events including the at least one segment of the video recording of the gameplay.

20. The method of claim 12, further comprising providing at least one trigger to the digital device, the trigger being satisfied by at least one of the set of trigger conditions occurring during the gameplay.

21. The method of claim 12, wherein the metadata includes at least one category of at least one of the set of trigger indicators.

22. The method of claim 21, wherein selecting the subset of the set of trigger indicators based on the set of compilation reel rules comprises selecting the subset of the set of trigger indicators based, at least in part, on the at least one category.

23. A computer readable media comprising executable instructions, the instructions being executable by a processor to perform a method, the method comprising:

receiving metadata corresponding to gameplay on a digital device, the metadata including a set of trigger indicators associated with a set of gameplay events occurring during the gameplay, the set of trigger indicators being based on a set of trigger conditions occurring during the gameplay, wherein each trigger condition is associated with a weight indicative of a relative significance of a corresponding gameplay event that satisfied the trigger condition;

retrieving a set of compilation reel rules;

selecting a subset of the set of trigger indicators based on the set of compilation reel rules and based on the weight associated with the trigger conditions corresponding to the subset of the set of trigger indicators; and generating a compilation reel based on the subset of trigger indicators selected by the trigger indicator selection module, the compilation reel including video of the gameplay events that occurred during the gameplay corresponding to the subset of trigger indicators.

* * * * *